(12) United States Patent
Pal et al.

(10) Patent No.: US 7,383,285 B1
(45) Date of Patent: Jun. 3, 2008

(54) METHOD FOR EXPOSING HIERARCHICAL TABLE STRUCTURES AND RELATIONSHIPS TO OLE DB APPLICATIONS

(75) Inventors: Suprio Pal, Corona, CA (US); Linh Hue Ly, Rancho Santa Margarita, CA (US)

(73) Assignee: Unisys Corporation, Blue Bell, PA (US)

( * ) Notice: Subject to any disclaimer, the term of this patent is extended or adjusted under 35 U.S.C. 154(b) by 387 days.

(21) Appl. No.: 11/074,826

(22) Filed: Mar. 8, 2005

(51) Int. Cl.
*G06F 17/30* (2006.01)

(52) U.S. Cl. .................... 707/104.1; 707/101; 707/2; 707/10; 719/328; 709/203

(58) Field of Classification Search ............... 707/2, 707/10, 100, 101, 104.1; 709/203; 719/328
See application file for complete search history.

(56) References Cited

U.S. PATENT DOCUMENTS

| | | | | |
|---|---|---|---|---|
| 5,907,844 A * | 5/1999 | Guay et al. | ................. | 707/100 |
| 5,974,407 A * | 10/1999 | Sacks | ............................ | 707/2 |
| 6,016,501 A * | 1/2000 | Martin et al. | ............... | 707/203 |
| 6,366,900 B1 | 4/2002 | Hu | | |
| 6,398,105 B2 * | 6/2002 | Ramberg et al. | ............ | 235/375 |
| 6,505,205 B1 * | 1/2003 | Kothuri et al. | ............. | 707/100 |
| 6,665,677 B1 * | 12/2003 | Wotring et al. | ............. | 707/100 |
| 6,842,904 B1 * | 1/2005 | Bartz et al. | ................. | 719/328 |
| 6,853,997 B2 * | 2/2005 | Wotring et al. | ............. | 707/100 |
| 6,985,905 B2 * | 1/2006 | Prompt et al. | ............. | 707/102 |
| 7,139,768 B1 * | 11/2006 | Janzig et al. | ............... | 707/102 |

OTHER PUBLICATIONS

Andreras Meier et al., Hierarchial to Relational Database Migration, 1994, IEEE Software, pp. 21-27, provide with First Office Action.*
Stephen Rauch, Talk to Any Database the COM Way Using the OLE DB Interface, Jul. 1996, Microsoft Systems Journal, 12 pages, provided with First Office Action.*
Jose A. Blakeley, Universal Data Access with OLD DB, 1997, IEEE, pp. 2-7, provided with First Office Action.*
U.S. Appl. No. 10/163,103, filed Jun. 4, 2002, Pal.
U.S. Appl. No. 10/209,481, filed Jul. 30, 2002, Pal.

* cited by examiner

*Primary Examiner*—Pierre M. Vital
*Assistant Examiner*—Edward J Kennedy
(74) *Attorney, Agent, or Firm*—Alfred W. Kozak; Robert P. Marley; Charles A. Johnson

(57) ABSTRACT

A method and system is provided that enables OLE DB (Object Linking and Embedded Database) applications to access embedded table-structured relationships in hierarchical databases as Normalized relational tables.

7 Claims, 10 Drawing Sheets

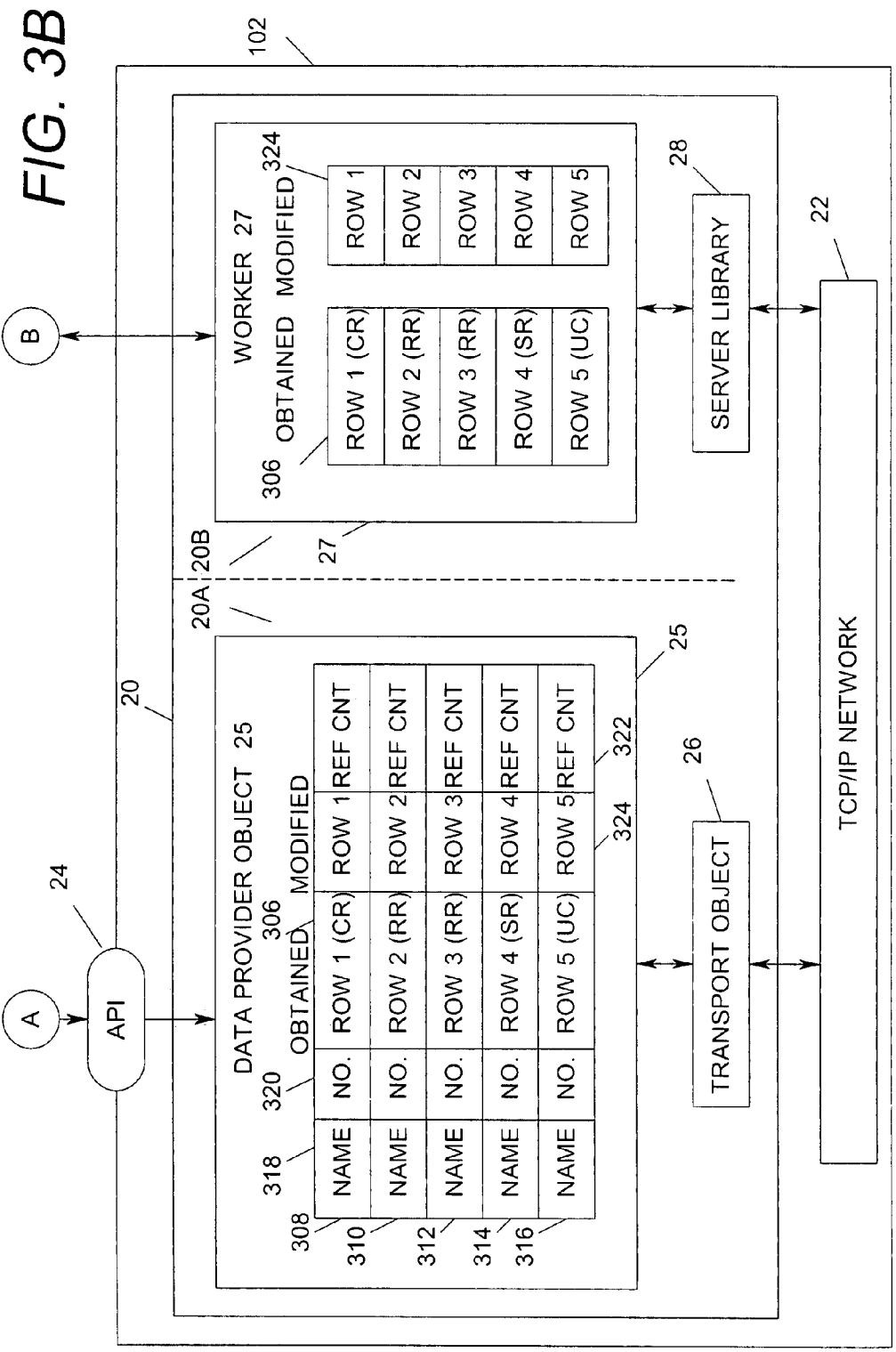

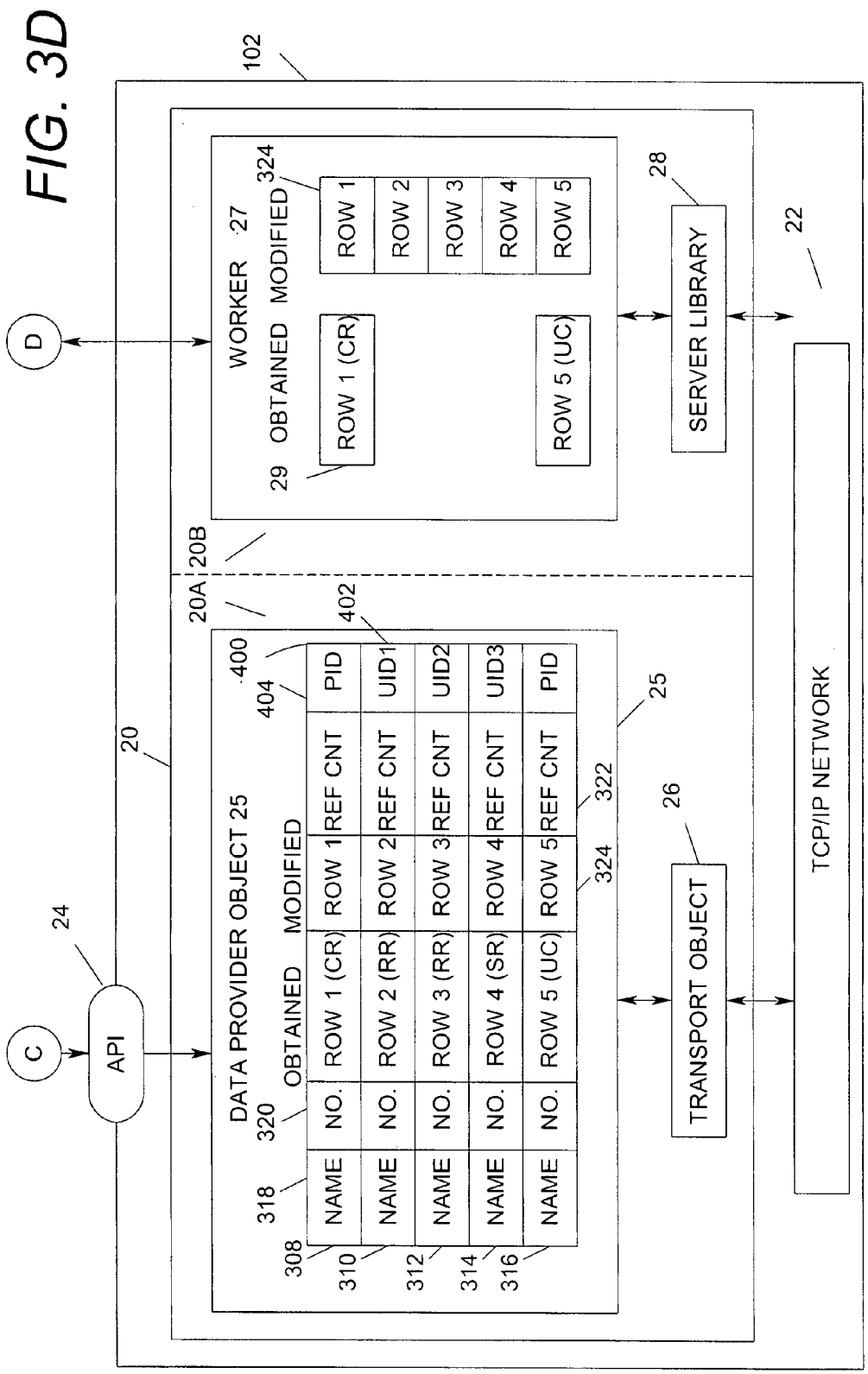

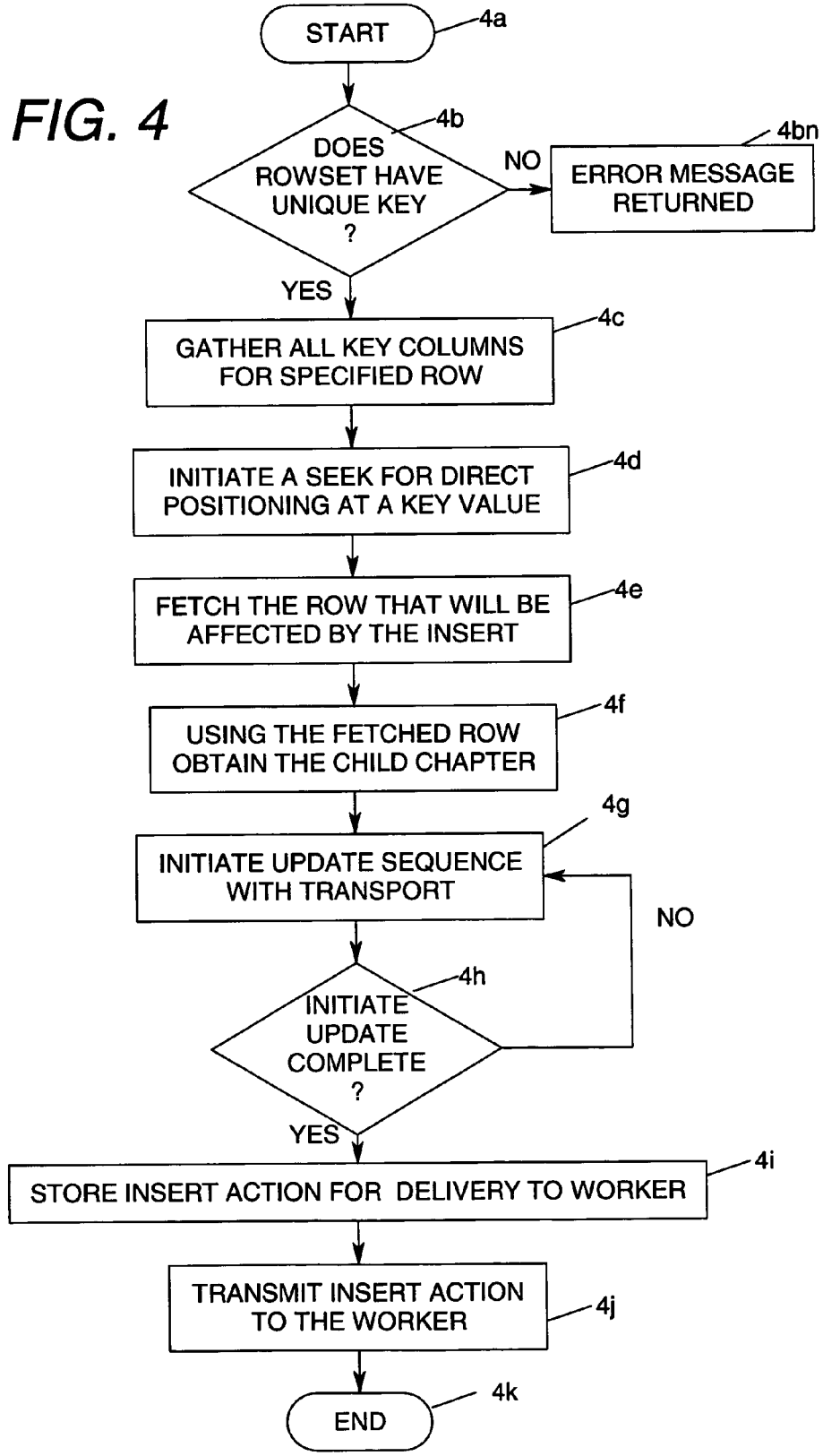

HIERARCHICAL FORMAT

LEVEL 1: CUSTOMER DATA SET (PARENT)
(CUSTOMERID ALPHA (5);
:
:

LEVEL 2: ORDERS DATA SET (CHILD)
(ORDER-NUM ORDER (8):
:
:

LEVEL 3: ORDERDETAILS UNORDERED DATA SET
(ORDERDET_NUM NUMBER (5);
QUANTITY NUMBER (6);
UNITPRICE NUMBER (19, 2);
DISCOUNT NUMBER (4, 2);
);
ORDDETL-SET SET OF ORDERDETAILS
KEY IS ORDERDET_NUM;

*FIG. 7A*

NORMALIZED FORMAT

CUSTOMER                ORDERS

| CUSTOMER NAME | CUSTOMER ADDRESS | ORDER NO. | QUANTITY UNITS |
|---|---|---|---|
| A CO. | A STREET | A 10 | 100 |
| B CO. | B AVE. | B 15 | 150 |
| C CO. | C STREET | C 20 | 200 |
| D CO. | D STREET | D 50 | 500 |

*FIG. 7B*

METHOD FOR EXPOSING HIERARCHICAL TABLE STRUCTURES AND RELATIONSHIPS TO OLE DB APPLICATIONS

CROSS-REFERENCES TO RELATED CASES

This application is related to U.S. application Ser. No. 10/209,481, filed on Jul. 30, 2002, issued as U.S. Pat. No. 7,213,020 on Jun. 11, 2007; entitled "METHOD FOR USING TRANSACTION IDENTIFIERS FOR OPTIMIZING UPDATE PERFORMANCE OF OLE DB DATABASE APPLICATIONS", which is incorporated herein by reference.

This application is related to U.S. application Ser. No. 10/163,103, filed on Jun. 4, 2002, issued as U.S. Pat. No. 7,058,631 on Jun. 6, 2006; entitled "METHOD AND SYSTEM FOR ACCESSING LOGICAL RELATIONSHIP DATA IN A DATABASE FROM A DATA-ACCESS SYSTEM UTILIZING BOOKMARKS", which is incorporated herein by reference.

This application is related to application, U.S. Ser. No. 09/359,998, which issued as U.S. Pat. No. 6,366,900 entitled "METHOD FOR ANALYZING THE CONDITIONAL STATUS OF SPECIALIZED FILES", which is incorporated herein by reference.

FIELD OF THE INVENTION

The method of the present invention provides a mechanism that enables OLE DB (Object Linking and Embedding Database) applications to access embedded table structured relationships in hierarchical databases as Normalized relational tables.

DESCRIPTION OF RELATED ART

The Unisys Enterprise Database Server for ClearPath NCP (a.k.a. DMSII) consists of Tables and Indexes. NCP refers to Unisys Master Control Program, which is the Operating System for Unisys ClearPath mainframes. Tables generally are used to store facts. For example, a table called "Customers" may store data pertaining to the customers of an enterprise such as Customer-Name and Customer-Address. Another table called "Orders" would store the Orders that have been generated by the customers. This table would store information such as the product and the quantity ordered. Now, customers and orders have a one-to-many relationship between them because customers place one or more orders. While DMSII does allow such relationships to be maintained in tables (much like relational databases), it also allows them to be represented as hierarchies.

However, many applications cannot deal with hierarchical relationships if they are exposed as hierarchies. For example, SQL (Structured Query Language) query processor implementations are known to be deficient in dealing with hierarchies because SQL is designed to access relational databases. In addition, the OLE DB specification itself allows such hierarchies to be exposed as parent-child hierarchies known as chapters. However, there are many OLE DB applications that would like to access such hierarchical relationships as hierarchies as well as normalized one-to-many relationships.

The prior art software did not allow access to hierarchical tables and relationships stored in DMSII databases as normalized one-to-many relationships. It is therefore important to have a system that enables data access applications such as those using OLE DB, to access the hierarchical tables and relationships as normalized tables exposing the underlying one-to-many relationships between the master and embedded tables.

BACKGROUND OF THE INVENTION

A Database Management System consists of a set of tools used to develop and manage a database. The present system utilizes a DMSII which is a Database Management System available on a Unisys Corporation's ClearPath HMP NX, and the Unisys A-Series systems. A background for the Unisys DMSII systems is available in a publication of the Unisys Corporation, Document 8807 6625 000, entitled "Getting Started With DMSII" and published in September 1997 by the Unisys Corporation. The DMSII Utilities provide database back-up and recovery capability for the entire database or for partial databases. The background operations of the DMSII utility enhancements are published in a Unisys Corporation publication Document 98037/4 and entitled "DMSII Utility Enhancements" published on Mar. 31, 1999.

Database Management Systems are used by many large and small businesses such as airline reservation systems, financial institutions, retail chains, insurance companies, utility companies and government agencies. The present Database Management System (DMS) in its form as DMSII is used to build database structures for items of data according to some appropriate logical model, such as relational, hierarchical, or network. Further, the Database Management System is used to manage the database structures and keep the structures in some other stable order while various application programs may be retrieving or changing the data. The present embodiment of DMSII has a data definition language designated as Data And Structure Definition Language (DASDL).

There are various tasks that are performed in database management and these involve (i) monitoring and optimizing database performance; (ii) the use of database control for monitoring multi-program database access; (iii) the function of the data integrity and safety done by integrity checking and preventing access to the same data by multiple applications occurring at the same time; (iv) the function of defining data structures and the data fields within them, including the function of modifying data structures; (v) data access operations and developing an application program to retrieve data or to change data; (vi) the function of data shareability to provide multi-program access without conflicts and provide database definitions to the application program; (vii) in database and data security, to prevent unauthorized database access; (viii) ensuring independence of application programs from certain data changes and preventing the revision of application programs every time a structure changes; (ix) in database and data recovery, performing the resumption of database operations after an interruption; (x) tracking data changes by keeping a record of every change made to the data; (xi) for data change integrity, ensuring that update changes are applied to, or removed from, the database in their entirety; (xii) providing a recent copy of the database as a reserve by backing-up the database and storing copies of audit files and all other database files; (xiii) providing for database scalability by growing or shrinking the database according to the ongoing needs at the time.

The DMSII provides standard software files that perform services and operations for all the databases connected to the system's Enterprise Server. This enables a viewing of a list of all these files on the user terminal.

In the ordinary course of operations, the application program user will submit changes to data or retrieve data while running a particular application program. Then, changes can be made which add, modify and delete data. A Database Administrator (DBA) keeps the database running smoothly and enforces the rules for data integrity and security. Users access the database through a given application program which itself does not access the data directly. Instead, the program interacts with the DMSII software and the database tailored software, which is directed by the access routines of the Data Management System to provide accesses, retrievals and the storage of data in the physical database file.

In regard to access, an application user will access the data in order to (i) make an inquiry to get a Read of data in the database, or (ii) to provide an update by doing a Write to the database thus, adding, deleting or changing data. The access for either purpose contributes to an operation on the database which is called a "transaction".

A transaction is a sequence of operations grouped by a user program because the operations constitute a single logical change to the database, At the end and finality of the transaction point, the transaction is complete and without error, and it is considered as being committed to the database.

Actual real world data goes into special logical structures that are used by the Data Management System to store data. The database is designed to map categories of data into suitable structures. For example, the real world data would have a character with a structure called a "data set". An example of this would be a particular person's name. Then, real world data that can serve as an index of a whole data set has a structured name called a "set". This, for example, might be the social security number of any employee. Then there is data that can serve as an index of a data set under a certain condition, and this is called a "subset". This might be an employee's work number, for example. Then, there is data about each instance of a particular category and the structure name for this is "data item". An example of this might be the name and address of the category (person). Then, there is data related to the database as a whole, and this involves a structure called "global data item". An example of this might be the total number of employees in a company. Once there has been identification of the real-world data which is to be stored in the database, it is then necessary to define that data in relationship to the data structures of the data management system that holds data. When this data is defined within "structures", then the data management system and the system software programs an application program that can then understand how to make this data accessible for various inquiries and/or changes. This is done with the Data and Structure Definition Language (DASDL).

The Data Management System structures are the building blocks of the Data Management System database. Here, the "data set" has the purpose of storing data pertaining to a data category in a collection of records. A "set" has the purpose of indexing all records in a data set. A "subset" serves the purpose to index some records in a data set according to some given criteria. The "data item" is a structured name which defines a unit of information about a category in a given field (column) of a data set record. A "global data item" serves the purpose of storing a unit of information about the entire database or any of its involved structures.

In general discussion about the types of data and the names of data structures, it is often seen that in a relational database, a "data set" is called a "table". A "set" or "subset" is frequently called an "index". A "data item" is often called a "field" or a "column", or is often called by its data name, for example, a project number. "Structures" are made of common file components designated as records and fields.

A record is a group of logically-related data items in a file. Often, a record is called a row. Data items reside in different fields in the records. For example, a record might involve a series of data such as an employee's name, the employee's I.D., the employee's social security number and years of employment. A group of such records would constitute a file.

The operating system which is used by the data management system will treat the record as a unit. The system makes data available to users in records and not in individual single items of data. In programming languages, the record is the unit of data that the system reads from or writes to a file in one execution cycle of a Read or Write statement in a program.

If the application program wants to change a data item in a given record, the Data Management System brings a copy of the record from the physical storage over to memory, then enables that data item to be changed, and then writes the changed record back to the file.

A "field" is a consecutive group of bits or bytes within a particular component of a record which will represent a logical piece of data. A field or column is defined by the description of the data item it is to hold. For example, if one field carries the name of an employee, this field in the record could be called the name field.

The "data set" is a physical file, that is to say, a collection of related data records stored on a random-access storage device, such as a disk in which the data resides.

A data set is kept up-to-date in several ways: (i) here, application programs add, change, or delete individual pieces of data or records stored in the data set; (ii) the Database Administrator (DBA) maintains the structure of the data set by keeping the data set within certain maximized limits, by adding, deleting or changing the definition of a data item, creating new sets or subsets, monitoring automatic processes that guard data integrity and creating guard files to enhance the security of the data.

A "set" is a separate stored file that indexes all the records of a single data set. The Data Management System uses sets in order to locate records in a data set. A set has no meaning apart from its related data set. The set structure enables an application program to access all records of a data set in some logical sequence.

A "subset" can be considered identical to a set, except that the subset need not contain a record for every record of the data set. A subset is a file that indexes none, one, several, or all of the records in a data set. The subset structure enables an application program to access only records of a data set that meet a particularly required condition.

For example, an application program may compile a list of people who are "managers". Thus, it is seen that the database designer created the "manager" subset. Thus, in order to retrieve a record of managers, the data management system can use the smaller file, that is, the subset, to quickly point to the corresponding records in the larger file which is the data set. As with the set, the subset must also be kept up-to-date.

A "data item" is an element of data. In the Data Management System, a data item can also be the field (column) in the database record. For example, the social security number could be considered as a data item in the sample data set designated "person". The purpose of the data item is to describe the data to be stored. The data item provides the identity—type, size, location, and attributes—of one element of data for a database entity. When an application submits an update to a data item, the Data Management System will accept the update if it corresponds to the definition of a data item. Otherwise, the change is rejected and reported as an exception. The Database Administrator will add, delete or change the data item definitions.

There are a number of data items that are used by the Data Management System. These include the type called "alphanumeric" which include words and characters, names, addresses, dates and titles. Then, there are data items designated as "numeric" which involve integers and decimals with or without signs. Then, there are data items designated as "real" which involve single precision floating point numbers that occupy one word. An example of this would be, for example, an employee's salary. Then, there are data items which are called "Boolean" which involve TRUE and FALSE values.

The "global data item" is a data item, a group item, or a population item that is not part of any data set but still pertains to the database as a whole. Such global data items are stored in one special record called the "global record" in the DASDL declaration which is outside the structured definitions. Sometimes the global record is placed just before the structured definitions in the DASDL file. The global data item has the purpose of holding permanent information about the database as a whole or about a particular data set. It also acts as a place holder for information that can be derived from the database.

One of the most significant options in DASDL (Data And Structure Definition Language) is that it is possible to define the database as to whether the database is to be audited. The data management system supports both logging changes to a database (auditing the database) or not logging changes (maintaining an unaudited database). There are advantages in auditing a database since this assures the user that if a database failure occurs, there will be a record of database changes with which one can restore the database to a completely integral state and thus avoid loss of information and corruption of information.

SUMMARY OF THE INVENTION

A specialized Enterprise Database Server utilizing a Master Control Program (MCP) constitutes a Data Management system (DMSII). The DMSII provides Tables and Indexes. The Tables store data such as "customers" and "orders". The Table's "customers", and "orders", have a "one-to-many" relationship, such that one customer may have many orders.

The DMSII allows such relationships in separate tables, but also allows them as "hierarchies", much like relational databases.

Many applications, such as SQL (Structured Query Language) processor implementations cannot deal with hierarchical relationships that are set as hierarchies. Many OLE DB applications would like to access hierarchical relationships, as well as normalized one-to-many relationships, but cannot do both types of accesses.

The present invention enables OLE DB applications to access hierarchical structures as relational tables.

The method of the present invention provides a mechanism that enables OLE DB applications to access DMSII embedded table structures (datasets) in hierarchical databases as Normalized relational tables. When embedded datasets are normalized, each row in the normalized rowset consists of a record from the embedded dataset joined with the columns from the master (or owner) dataset records.

Master datasets are represented as standard OLE DB rowsets in which any columns containing embedded data have been suppressed, or hidden. If embedded datasets have indexes, normalized indexes are created for every combination of the sets of each of the masters till the disjoint master. Since the outermost disjoint dataset can always be traversed without an associated set, a pseudo index is associated with the outermost disjoint dataset. For example, if the master dataset M has two indexes—A and B—and the embedded dataset E has three sets—X, Y, and Z—then two normalized tables are exposed as M and M_E—and nine new indexes are created for the embedded datasets by joining each master index with each embedded index. Their names are constructed from the names of the indexes they comprise, separated by an underscore (for example—M_X, M_Y, M_Z, A_X, A_Y, A_Z, B_X, B_Y, and B_Z.) The indexes for the master dataset, M remain the same, A and B.

GLOSSARY ITEMS

1. OLE (Object Linking and Embedding) APPLICATIONS: A distributed object system and protocol from Microsoft, also used on the Acorn Archimedes. OLE allows an editor to "farm out" part of a document to another editor and then reimport it.
2. INDEX STRUCTURES: A structure where a number is used to select an element of a list, vector, array or other sequence. See also Index File.
3. INDEX FILE: A database file which contains the key and a pointer which points to a record in the table data file. The index file is used to search for the data record based on a key value for efficient rapid access. See also Index Structure.
4. INDEX: This is a term which also indicates the file containing the key and a pointer which points to a record in the table data file.
5. Indexed Organization: The permanent, logical file structure in which each record is identified by the value of one or more keys within that record.
6. BASE TABLE: A structure in the database that contains rows. Each row in the table consists of one or more columns.
7. NON-KEY COLUMNS (AKA KEY-DATA/KEY-DATA** COLUMNS): A column that is present in an index structure to provide fast access but is not used for collation.
8. BINDINGS: A binding contains information about the consumer's buffer. The most notable information is the ordinal of the column in the table to which the binding applies (iOrdinal), what is bound [dwPart] (the data value, its length, and its status), the offsets in the buffer to each of these parts (obValue, obLength, obStatus), and the length (cbMaxLen) and type (wType) of the data value as it exists in the consumer's buffer. Each binding associates, or binds, a single column or parameter to the consumer's buffer.
9. KEY COLUMNS (AKA KEY*): A column that is used for collating an index (See also Item #25).
10. FIND KEY OF: It is a method of retrieving only the data columns present in an index structure.
11. DEFERRED COLUMN RETRIEVAL: For a deferred column, the provider is not required to retrieve data from the data store until IRowset::GetData is called for that column. It is provider-specific when the data in a deferred column is actually retrieved. For example, it might be retrieved when the command is executed, when the row handle is fetched, lazily in the background, or when IRowset::GetData or a method on another interface is called for the column.

12. DATA ACCESS SYSTEM: A Data Access System defines the model used by applications to access data. The model typically assumes the data is not directly accessible by the application but resides in some separate data store, such as a file or e-mail system, a database, or a resource on the Internet. In such a Data Access system, the application requests information from an intermediary that returns a copy of the desired data to the application. Although different data stores have different native means to access their information, the intermediary presents a single, consistent means of data access to the application.

13. ENTERPRISE DATABASE SERVER (MCP PLATFORM): The actual name used in Unisys product literature for the DMSII database management system.

14. ROWSET: Rowsets are the central objects that enable OLE DB components to expose and manipulate data in tabular form. A rowset object is a set of rows in which each row has columns of data. For example, providers present data, as well as metadata, to consumers in the form of rowsets. Query processors present query results in the form of rowsets.

15. ACCESSOR: An accessor is a data structure created by the consumer that describes how row or parameter data from the data store is to be laid out in the consumer's data buffer. For each column in a row (or parameter in a set of parameters), the accessor contains a binding. A binding is a data structure that holds information about a column or parameter value, such as its ordinal value, data type, and destination in the consumer's buffer. When calling an OLE DB method that transfers data, such as IRowset::GetData, IRowsetChange::SetData, or ICommand::Execute, the consumer passes as parameters to the method an accessor handle (or, when transferring parameter data, a DBPARAMS structure containing an accessor handle) and a pointer into the consumer's data buffer. The provider uses the accessor to determine how to transfer the data to or from the consumer's buffer.

16. CREATEACCESSOR: It is the method call used to create an accessor from a set of bindings.

17. SESSION: Sessions provide methods for creating commands and rowsets and for creating and modifying tables and indexes. They also define transaction scope and can be used to create transaction objects, which are used to control nested transactions 18. TRANSACTION: A unit of work in which a series of related operations occur during an application process. A transaction executes exactly once and is atomic— either all of the work is done or none of it is.

19. ISOLATION LEVEL: Transaction isolation levels are a measure of the extent to which changes made outside a transaction are visible to that transaction. In particular, transaction isolation levels are defined by the presence or absence of the following phenomena— Dirty reads, Non-repeatable reads and phantoms.

20. READ COMMITTED: A transaction operating at the Read Committed isolation level cannot see changes made by other transactions until those transactions are committed. At this level of isolation, dirty reads (reading of uncommitted data) are not possible but non-repeatable reads and phantoms are possible.

21. DEFERRED MODE: Indicates a data retrieval mode in which the Provider is retrieving only certain columns of a table. For other columns, the Provider is not required to retrieve data from the data store until IRowset::GetData is called for that column.

22. OLE DB INTERFACE API: OLE DB is a set of COM-based interfaces that expose data from a variety of sources. OLE DB interfaces provide applications with uniform access to data stored in diverse information sources, or data stores and that also provide the ability to implement additional database services. These interfaces support the amount of DBMS functionality appropriate to the data store, enabling the data store to share its data.

23. MASTER CONTROL PROGRAM (MCP): Unisys Master Control Program/Advanced Systems. The comprehensive virtual memory operating system which drives the Unisys ClearPath/A-Series family of hardware.

24. DATA MANAGEMENT SYSTEM II (DMSII): A specialized system software package used to describe a database and maintain the relationships among the data elements in the database. This system is described in a September 1977 Publication of Unisys Corporation, entitled "Getting started with DMSII," Unisys Publication No. 8807 6625-000.

25. KEY: (1) A field used to locate or identify a record in an indexed file; (2) In COBOL, a data item that identifies the location of a record, or a group of data items that identifies the ordering of data; (3) In Data Management System II (DMSII), a field that serves as a retrieval key for a set or subset.

26. KEY COLUMNS: This is a portion of a data record which contains the key data.

27. KEY FIELD: This is a portion of a data record which contains key data.

28. KEYEDIOII: This is a software methodology designated as Unisys Indexed Sequential Access Method (ISAM) software for COBOL 74 and Report Program Generator (RPG) programming languages. It is based on DMSII (Data Management System II) so as to take advantage of the features of DMSII. KEYEDIOII is basically described in Unisys Corporation Publication 5044043.372 (1988).

29. DATA SET: A disk file (potentially, a group of disk files) containing data records all in a similar internal format. An e-@ction Unisys Enterprise Database Server structure type declared in DASDL (Data And Structure Definition Language).

30. SET: Same as an Index Structure. (See #2).

31. OLE DB DATA PROVIDER: An OLE DB Data Provider is any software component that exposes an OLE DB interface. The OLE DB provider exposes the OLE DB programming model by using an object model (the set of COM objects that accomplish the tasks in the programming model). Providers expose the OLE DB interfaces on the COM objects that encapsulate a portion of the functionality needed to access and update data.

32. COLUMN BINDING (BINDINGS IN A COLUMN): (Same as BINDINGS. See #8).

33. READ UNCOMMITTED: Transaction operating at the Read Uncommitted level can see uncommitted changes made by other transactions. At this level of isolation, dirty reads, non-repeatable reads, and phantoms are all possible.

34. ORACLE DATABASE: The Database Management system implemented by Oracle Corporation.

35. MICROSOFT EXCEL: A spreadsheet program from Microsoft, part of their Microsoft Office suite of pro- 36. DATA PROVIDER OBJECT: The CON component in the Unisys OLE DB implementation that exposes the OLE DB interfaces. It passes client requests for data through the network data transport components to the Worker on the MCP host and returns requested data from the Worker to the client application in the requested format.
37. TRANSPORT OBJECT: The COM component in the Unisys OLE DB implementation that is used for communicating with the Server/Worker processes on the MCP platform by means of the TCP/IP network connecting the client workstation and the MCP server.
38. WORKER: The module on the MCP host which implements most of the functionality to access the Enterprise Database Server (i.e. DMSII) software for inquiries, transactions and updates.
39. SERVER LIBRARY: It is a shared-by-all library executing on the MCP platform that manages the TCP/IP connections emanating from client workstations. It spawns Worker tasks to handle each connection and manages its lifetime.
40. TCP/IP NETWORK: The de facto standard Ethernet protocols incorporated into 4.3BSD Unix. TCP/IP was developed by DARPA for internetworking and encompasses both network layer and transport layer protocols. While TCP and IP specify two protocols at specific protocol layers, TCP/IP is often used to refer to the entire DoD protocol suite based upon these, including telnet, FTP, UDP and RDP.
41. CLEARPATH OS 2200: Another Unisys mainframe computer family which run the OS2200 operating system.
42. NULL ACCESSOR: An accessor for which no column bindings have been created.
43. BOOKMARK: Bookmarks are placeholders that enable the application to return quickly to a row. Applications that use bookmarks to identify rows to a provider treat bookmarks as opaque binary values.
44. DATA RECORD: Same as a row. A row is a set of related data items, or columns, that are treated as a unit.
45. COLLATION: This specifies the bit patterns that represent each character (character set) and the rules by which characters are sorted and compared.
46. CROWSET MEMBER VARIABLE: CROWSET is an example of a C++ class that implements a rowset object. Classes, which can contain variables and functions, introduce user-defined types into a program. User-defined types in programming languages are collections of data which, taken together, describe an object's attributes and state. Class types in C++ enable you to describe attributes and state, and to define behavior. The variables and functions of a class are called members.
47. M_GETDATA CANDEFER: (See #46). This is an example of a member variable.
48. ENTERPRISE DB SERVER: (Same as DMSII #13).
49. CLEARPATH MCP: (See #23). MCP refers to Unisys Master Control Program, which is the Operating System for Unisys ClearPath mainframes.
50. TABLES: A table represents some class of objects that are important to an organization. For example, a company may have a database with a table for employees, another table for customers, and another for stores. Each table is built of columns and rows (called attributes and tuples in relational theory). Each column represents some attribute of the object represented by the table. For example, an Employee table would typically have columns for attributes such as first name, last name, employee ID, department, pay grade, and job title. Each row represents an instance of the object represented by the table. For example, one row in the Employee table represents the employee who has employee ID 12345.
51. INDEXES: (Same as INDEX #4).
52. CUSTOMERS TABLE (NAMES & ADDRESS): (See #50). NAMES and ADDRESS are attributes of the CUSTOMERS table.
53. ORDERS TABLE: (See #50). The ORDERS table can contain one or more orders placed by a customer and can have such attributes as ORDERNO, PRODUCT, QUANTITY.
54. RELATIONAL DATABASE: Although there are different ways to organize data in a database, relational databases are one of the most effective. Relational database systems are an application of mathematical set theory to the problem of effectively organizing data. In a relational database, data is collected into tables (called relations in relational theory).
55. HIERARCHIES: Hierarchies model 1:n relationships between tables, such as a master-detail relationship between Customers, Orders, and Items. A hierarchy can be stored persistently in a database or computed by a command.
56. HIERARCHIES IN RELATIONSHIP: (Same as above).
57. SQL: To work with data in a database, you have to use a set of commands and statements (language) defined by the DBMS software. Several different languages can be used with relational databases; the most common is SQL. The American National Standards Institute (ANSI) and the International Standards Organization (ISO) define software standards, including standards for the SQL language, such as Entry Level of SQL-92, the SQL standard published by ANSI and ISO in 1992.
58. MASTER DATASET: A disjoint dataset, i.e. one that is not contained within another dataset, is known as the master dataset.
59. PARENT-CHILD HIERARCHIES=CHAPTERS: (See #55). Embedded data sets can be represented in OLE DB as OLE DB chaptered rowsets or normalized as independent rowsets. The default is chapter representation as defined in the OLE DB specification.
60. ONE-TO-MANY RELATIONSHIP: A one-to-many relationship is a very common type of relationship. For example, the publishers and titles have a one-to-many relationship: each publisher produces many titles, but each title comes from only one publisher. In a database storing this type of relationship, a row in table A can have many matching rows in table B, but a row in table B can have only one matching row in table A.
61. RELATIONAL TABLES: Tables that are stored in relational databases are called relational tables.
62. NORMALIZED ROWSET: An OLE DB rowset that is created out of master and embedded datasets by the process of Normalization as described elsewhere.
63. MASTER DATASET RECORDS: The records belonging to a Master dataset are called master records.
64. STANDARD OLE DB ROWSETS: A rowset is a cache that holds data returned from a data store. A rowset can be envisioned as a rectangular array of zero or more rows and one or more columns, where each column has a specific data type. The rowset object represents the rowset, which is the central object that enables all OLE DB data providers to expose data in tabular form. The rowset object contains data from the data store retrieved in response to a command or a session object method and provides means to navigate from row to row within the rowset, to examine and modify data, and to propagate any modifications back to the data store. Values in columns, and parameters in commands, are set and retrieved using bindings and accessors. Bindings map the location of data in system and application memory and determine any data type conversions to be performed when data is moved from one to the other. Accessors are arrays of bindings that may be used by the interface methods that set or get values or parameters.

65. NORMALIZED INDEXES: An OLE DB rowset that is created out of master and embedded sets by the process of Normalization as described elsewhere.
66. PSEUDO-INDEX: An index which does not exist in the database but which is materialized during runtime.
67. HIERARCHICAL TABLE STRUCTURE: (See #55).
68. DMSII Dataset: A dataset that is included as one of the columns of another table and is said to be an embedded table.
69. EMBEDDED INDEX: A DMSII set that spans an embedded table.
70. MASTER INDEX: The index associated with a master dataset.
71. INDICES FOR MASTER DATASET: The sets associated with a Master dataset.
72. DIRTY READS: A dirty read occurs when a transaction reads data that has not yet been committed. For example, suppose transaction 1 changes a row. Transaction 2 reads the changed row before transaction 1 commits the change. If transaction 1 aborts the change, transaction 2 will have read data that is considered to have never existed.
73. NON-REPEATABLE READS: A non-repeatable read occurs when a transaction reads the same row twice but gets different data each time. For example, suppose transaction 1 reads a row. Transaction 2 changes or deletes that row and commits this change or deletion. If transaction 1 attempts to reread the row, it retrieves different row values or discovers that the row has been deleted.
74. PHANTOMS: A phantom is a row that matches the search criteria but is not initially seen. For example, suppose transaction 1 reads a set of rows that satisfy some search criteria. Transaction 2 inserts a new row that matches the search criteria for transaction 1. If transaction 1 reexecutes the statement that read the rows, it gets a different set of rows.
75. CDM (Content Data Model): An SGML based DoD specification for interactive materials. SGML is Standardized Generalized Markup Language.
76. MASTER TABLE: A DMSII dataset that contains embedded tables is known as the master table of the embedded tables.
77. EMBEDDED TABLE: (See #68).
78. MASTER INDEX: Any set (or index) associated with a master dataset.
79. EMBEDDED INDEX: Any set (or index) associated with an embedded dataset.
80. HIDECHAPTERS: The hidechapters attribute is a Boolean connection attribute (available only in the Unisys OLE DB Provider product) that can be set to TRUE or FALSE. When this attribute is set to TRUE, any embedded data sets or sets and any fields represented as chapters are hidden. This attribute does not apply to embedded data sets or sets that have been normalized or to fields that have been unrolled. The default value for this attribute is FALSE.
81. CONCEALINDEXES: The concealindexes connection attribute (available only in the Unisys OLE DB Provider product) conditionally suppresses all indexes from INDEXES schema rowset. This attribute is specifically targeted for SQL server users who execute a class of queries known as aggregate queries (SUM, MIN, MAX, AVG, and so on). These types of queries are more efficient if the table is scanned directly instead of an associated index.
82. NORMALIZE: The normalize connection attribute (available only in the Unisys OLE DB Provider product) normalizes all embedded structures in the database for which the attribute is declared. The default value for this attribute is FALSE.
83. NORMALIZED RELATIONAL TABLE: Tables that are stored in relational databases that use the process of normalization and are in the Third Normal Form. A relation in Third Normal Form has non-key attributes and are mutually independent and irreducibly dependent on the primary key.
84. MASTER DATA SET: (See #76).
85. STANDARD OLE DB ROWSET: (Same as #64).
86. OUTERMOST DISJOINT DATASET: (See #90).
87. WORKER: The module on the MCP host which implements most of the functionality to access the Enterprise Database Server (i.e., DMSII) software for inquiries, transactions and updates.
88. NORMALIZED DATA STRUCTURE: A normalized data structure refers to an embedded data set that has been normalized. When embedded data sets are normalized, each row in the normalized rowset consists of a record from the embedded data set joined with the columns from the master records. Master data sets are represented as standard OLE DB rowsets in which any columns containing embedded data have been suppressed, or hidden.
89. I/O OPERATION: An I/O (Input/Output) operation is one in which the system reads data from or writes data to a file on a peripheral device, such as a disk drive. When there is a failure of a read or a write operation, then this is considered to be an I/O error, which must be handled.
90. DASDL: Data And Structure Definition Language used for defining the DMSII database.
91. DISJOINT DATA SET: A data set is conceptually similar to a conventional file. It contains the actual records of information. A disjoint data set is a file that is not contained within another file. It is free standing.
92. FILE NAME: (1) A unique identifier for a file, consisting of 1 to 14 name constants separated by slashes. Each name constant consists of 1 to 17 letters, digits, hyphens, and/or underscores. A file name can be optionally preceded by an asterisk (*) or usercode, and optionally followed by ON and a family name; (2) In RPG, a name that designates a set of data items; (3) In COBOL, a user-defined word that names a file described in a file description entry or a sort-merge file description entry within the FILE SECTION of the DATA DIVISION.
93. KEY: (1) A field used to locate or identify a record in an indexed file; (2) In COBOL, a data item that identifies the location of a record, or a group of data items that identifies the ordering of data; (3) In Data Management System II (DMSII), a field that serves as a retrieval key for a set or subset.

94. RECORD KEY: A key, either the prime record key or an alternate record key, with contents that identify record within an indexed file.

95. RECORDS: A record is a group of logically related data items in a file. Sometimes a record is called a row. The data items reside in fields in the records. Sometimes a field is called a column.

96. TRANSACTION STATE: In Data Management System II (DMSII), the period in a user-language program between a begin transaction operation and an end transaction operation. For audited databases, DMSII software allows an application program to logically group update operations and to process the group as a single transaction. The start of the group transaction is signaled by a begin transaction operation. The end of the group transaction is identified by an end transaction operation. While the program is in a begin and end transaction operation, the program and the database are in transaction state.

97. TRANSACTION: (1) The transfer of one message from a terminal or host program to a receiving host program, the processing carried out by the receiving host program, and the return of an answer to the sender; (2) (X/Open), a complete unit of work. It can comprise many computational tasks, data retrieval, and communication. A typical transaction modifies shared resources; (3) In data management, a sequence of operations grouped by a user program because the operations constitute a single logical change to the database; (4) In the Screen Design Facility Plus (SDF Plus), the structure that performs the transfer of the message.

98. FIELDS: A field is a consecutive group of bits or bytes within a component of a record that represents a logical piece of data. A field (or column) is defined by the description of the data item it is to hold. As a point of information, sometimes in ordinary conversation, the name of the field is identified by the name of the data item. For example, for a data item named NAME, the field in the record can also be called NAME.

99. UNIQUE KEY: A unique key is a key field that does not contain duplicate key values. A unique key value is required when attempting to insert a new rowset into a normalized data structure. The unique key value is used to locate the correct record to insert the new rowset into.

100. CHILD RECORD: A normalized row consists of a record containing columns from the master data set and columns belonging to the embedded data set. Therefore, a child record refers to the columns belonging to the embedded data set.

101. INITIATE UPDATE SEQUENCE WITH TRANSPORT: During this process, a new update request object and initialization of its request buffer will be performed. An encoding of the update request will be performed for communication with the Server/Worker processes on the MCP platform. The Transport is a CON component in the Unisys OLE DB implementation that is used for communicating with the Server/Worker processes on the MCP platform by means of the TCP/IP network connecting the client workstation and the MCP server.

102. BOOKMARK: Bookmarks are placeholders that enable the application to return quickly to a row. Applications that use bookmarks to identify rows to a provider treat bookmarks as opaque binary values. In the case of a normalized embedded data structure, the bookmark created for each row is a concatenation of the master and child bookmarks. When an update and delete is being performed on a normalized embedded data set, the bookmark is used to locate the correct record to update or delete.

103. READ UNCOMMITTED (Also called BROWSE): A transaction operating at the Read Uncommitted level can see uncommitted changes made by other transactions. At this level of isolation, dirty reads, nonrepeatable reads and phantoms, are all possible.

104. READ COMMITTED (Also called CURSOR STABILITY): A transaction operating at the Read Committed level cannot see changes made by other transactions until those transactions are committed. A transaction ends when the consumer calls ITransaction::Commit or ITransaction::Abort, at which time all changes to the rowset that have been transmitted to the data store are committed or aborted. When committing a transaction, the database engine safe-stores all the update activity (explicit and implicit) that happened during the duration of the transaction in files called transaction logs. These logs help in the redo recovery process should it be required). At this level of isolation, dirty reads are not possible but nonrepeatable reads and phantoms are possible.

105. REPEATABLE READ: A transaction operating at the Repeatable Read Level is guaranteed not to see any changes made by other transactions in values it has already read. At this level of isolation, dirty reads and nonrepeatable reads are not possible, but phantoms are possible.

106. SERIALIZABLE (Also called ISOLATED): A transaction operating at the Serializable level guarantees that all concurrent transactions interact only in ways that produce the same effect as if each transaction were entirely executed one after the other. At this isolation level, dirty reads, non-repeatable reads, and phantoms are not possible.

BRIEF DESCRIPTION OF THE DRAWINGS

FIG. 3B is a drawing showing internal details of the Data Provider Object and the Worker module.

FIG. 3D is a drawing showing identification data associated with each row in the Data Provider Object and in the Worker module.

FIG. 4 is a flow chart showing steps for inserting a new row of data in a Normalized Data Structure.

FIG. 7 is a drawing illustrating the difference between a hierarchical data set (FIG. 7A), and a normalized data set (FIG. 7B), (Relational).

GENERAL OVERVIEW

Figure 1:
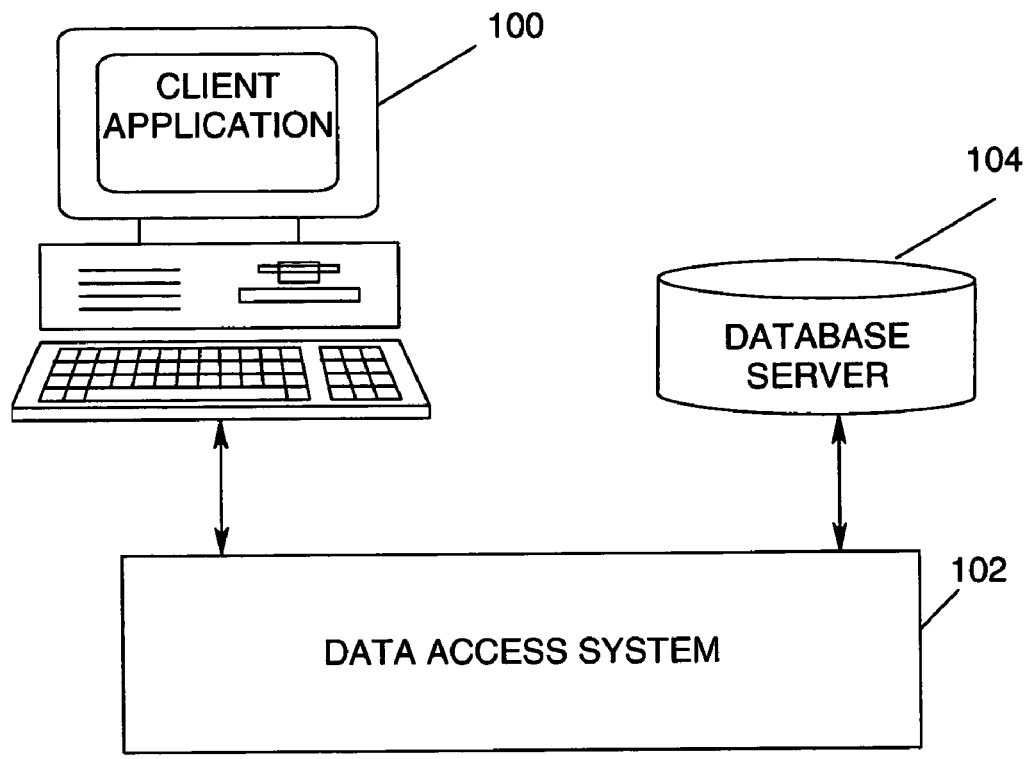
FIG. 1 is a generalized block diagram showing the basic modules involved.

A database is a collection of related persistent data that is used by the application systems of a given enterprise. Databases are composed of entities and relationships. Entities generally express facts about the universe. For example, an entity such as Employee would give facts about the Employee, such as Employee Name, Employee Job-Title, Employee Address and Employee Salary. Another entity such as Department would give facts about the department, such as Department Name, Department Manager and Department Budget. Databases store not only instances of basic entities such as Employee and Department, but also the relationships between instances of such entities. In this case, an Employee can belong to one and only one Department, but a Department can have many Employees. Also, a Department generally has only one manager who is an instance of the Employee entity. Several relationships are apparent here: a one-to-one relationship between Employee and Department, a one-to-many relationship between Department and its Employees, and a one-to-one relationship between Department and its manager, who is an instance of Employee.

In relational databases, entities and relationships are all represented as (and generally stored in) tables. In DMSII databases, one-to-many relationships can be stored in hierarchical tables. By including one or more tables among the columns of a table, the database designer can create the schema for storing hierarchical relationships. For example, since a customer can place one or more orders, including the table "Orders" as one of the columns of the Customer table, one can model this one-to-many relationship between customers and orders. If a DMSII table contains another table as one of the columns, then the contained table is called an embedded table, and the row in which it is declared is called the owner or master row of the embedded table. Any number of embedded tables can belong to each master.

Embedded data sets can be represented in OLE DB as OLE DB chaptered rowsets or normalized as independent rowsets. The default is chapter representation as defined in the OLE DB specification.

When embedded data sets are normalized, each row in the normalized rowset consists of a record from the embedded data set joined with the columns from the master records. Master datasets are represented as standard OLE DB rowsets in which any columns containing embedded data have been suppressed, or hidden.

If embedded datasets have sets, normalized indexes are created for every combination of the sets of each dataset. Since the outermost disjoint dataset can always be traversed without an associated index, a pseudo index is associated with the outermost disjoint data set. Thus, if the master dataset M has two sets—A and B—and the embedded dataset has three sets—C, D, and E—nine new indexes are crated for the embedded dataset by joining each master set with each embedded set. Their names are constructed from the names of the sets they comprise, separated by an underscore (for example: M_C, M_D, M_E, A_C, A_D, A_E, B_C, B_D, and B_E). The sets for the master dataset remain the same—A and B.

In this example, each set constructed for the embedded dataset includes the key fields from the master dataset first followed by the key fields from the embedded set.

If a dataset X with sets A and B has an embedded dataset Y with no sets, two sets are created for the embedded dataset that includes only the keys from the master sets. The names of these two sets are constructed from the names of the master sets concatenated with the name of the embedded data set (for example, A_Y and B_Y). Such indexes only support the SetRange function, not the Seek function. The SetRange function only allows ranges to be set based on the keys of the master set because there are no keys for the embedded dataset. If a master dataset with no indexes has embedded within it a data set with an index, the normalized embedded dataset will have no indexes.

All of these rules can be extrapolated to multiple levels of embedding.

Consider the following example to help explain the differences in modeling a one-to-many relationship in a relational system compared to a hierarchical system. In the DMSII Data Definition Language (a.k.a. DASDL), the above is described as follows:

---

HIERARCHICAL FOREMAT

```
CUSTOMER DATA SET
    (CUSTOMERID ALPHA (5);
    :
    :
    ORDERS DATA SET
        (ORDER-NUM NUMBER (8);
        :
        :
        ORDERDETAILS UNORDERED DATA SET
            (ORDERDET_NUM NUMBER (5);
            QUANTITY NUMBER (6);
            UNITPRICE NUMBER (19,2);
            DISCOUNT NUMBER (4,2);
            );
        ORDDETL-SET SET OF ORDERDETAILS
            KEY IS ORDERDET_NUM;
        );
        ORDERS-SET SET OF ORDERS KEY ORDER-NUM;
    );
CUSTOMER-SET SET OF CUSTOMER KEY IS CUSTOMERID;
```

---

It is therefore an embodiment of the invention to provide a method for accessing entities and relationships organized in hierarchical structures to be available as normalized tables and indexes. Using the methods of the present invention, the Normalized Tables and Indexes that result from the above hierarchy are:

Normalized Tables—
CUSTOMER
CUSTOMER_ORDERS
CUSTOMER_ORDERS_ORDERDETAILS
Normalized Indexes—
CUSTOMER_SET
CUSTOMER_ORDERS_SET
CUSTOMER_ORDERS_SET_ORDERDETAILS
CUSTOMER_ORDERS+SET_ORDDETL_SET
CUSTOMER_SET_ORDERS_SET_ORDERDETAILS
CUSTOMER_SET_ORDERS_SET_ORDDETL_SET Since the disjoint master table CUSTOMER can be traversed in either the table order or the CUSTOMER-SET index order, there are two Normalized indexes that one can use for traversing the ORDERS dataset. (In fact, one has to use one of these because of the aforementioned DMSII restriction).

Since there are two ways to traverse a CUSTOMER dataset, but only one way to traverse the ORDERS dataset and two ways to traverse the ORDERDETAILS dataset, there will be four different Normalized indexes available for the CUSTOMER_ORDERS_ORDERDETAILS normalized table.

Some of the Normalized indexes cannot be used for searching because they do not have any keys. They are only used for traversal. For example, the ORDERS table can be used with either the CUSTOMER_ORDERS_SET or CUSTOMER_SET_ORDERS_SET normalized indexes. However, only the latter can be used for search. The CUSTOMER_SET_ORDERS_SET index will have two keys: CUSTOMERID and ORDER-NUM, of which CUSTOMERID is the major key while ORDER-NUM is the minor key.

Special rules apply to updating the normalized embedded data sets and their parent or master data sets.

- Only columns that are not shared with the master row can be updated in a normalized rowset. The rowset schema reports all columns of the master data set as read-only.
- If the application attempts to update a column from the master record, the OLE DB Data Provider returns an error status of READONLY for that.
- For a master row that does not contain any child records, the normalized row consists of a record containing columns from the master data set and NULL values for all the columns belonging to the embedded data set. For such a normalized row, neither the columns for the master data set nor the NULL columns for the embedded dataset can be changed. An embedded data set record has to exist before any of its columns can be changed. Also, the delete operation cannot be performed for such rows.
- There are special considerations when insertions are done into embedded datasets exposed as normalized rowsets. Unlike access to embedded datasets exposed as OLE DB chapters, there is no reference to a master row available when an insert operation is performed. Therefore, the application must uniquely identify the master dataset record under which the embedded record is to be inserted. This identification is done by using a normalized index, which is composed of Enterprise Database Server sets that do not allow duplicates. Appropriate values must be set for the key columns pertaining to the master dataset so that the correct record in the master dataset can be located before the embedded record can be inserted within the appropriate master record.

DETAILED DESCRIPTION

Referring now to the drawings and FIG. 1 in particular, a top-level block diagram of a system that may employ the methods and systems of the present invention is shown. A client application 100 executing on a computing system is illustrated. The client application 100 is in communication with data access system 102 which, in turn, is in communication with database server 104. Database server 104 may be local or at a remote location relative to the computing system executing client application 100, then communicating with the database 104 to obtain the requested data, and providing the client application with the obtained data. For simplicity, only one computing system executing a client application 100 is illustrated in FIG. 1, although it should be noted that many more computing systems on which multiple client applications 100 may reside, may also be coupled to the data access system 102 to access a number of database servers 104.

Figure 2:
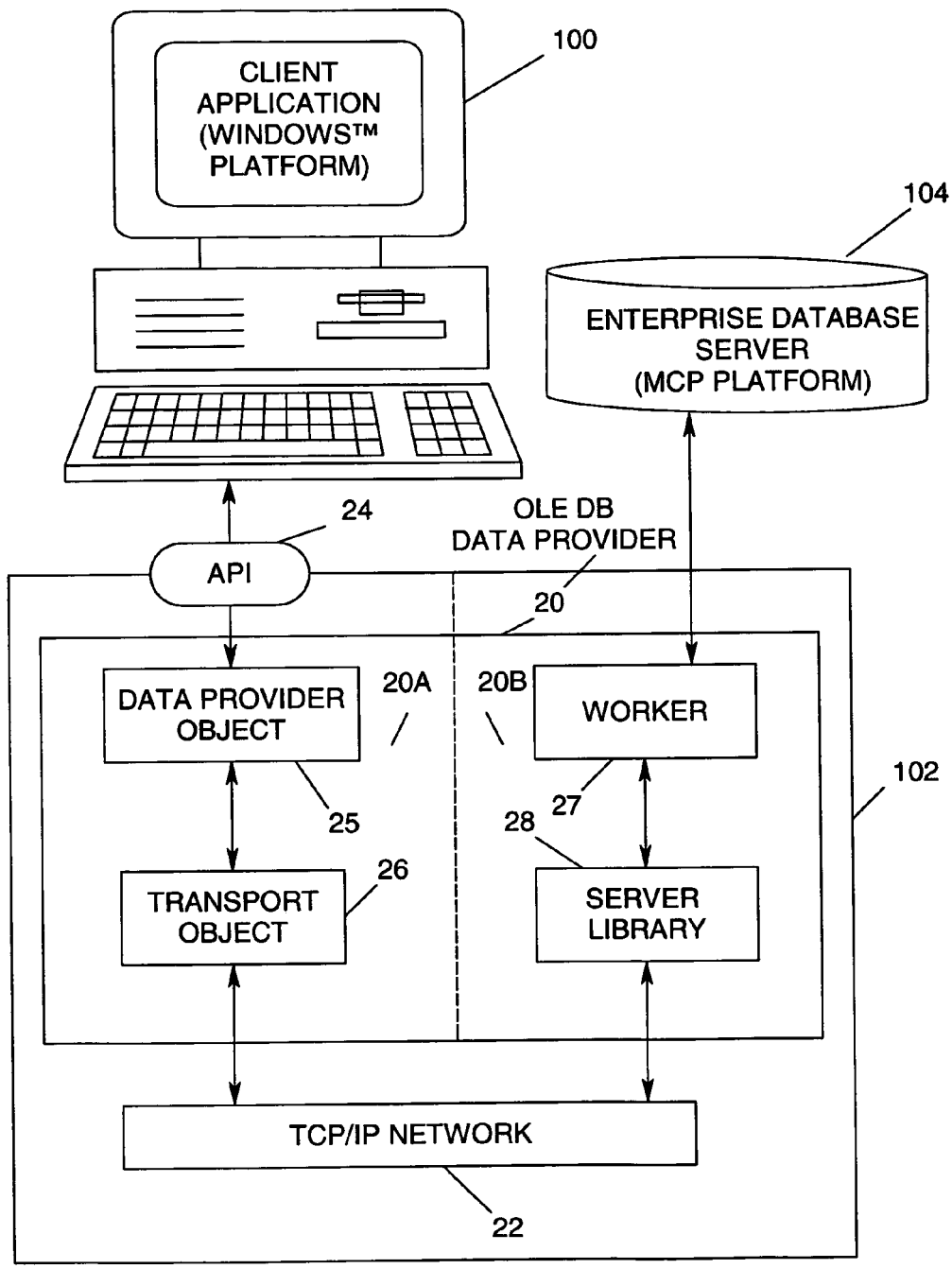
FIG. 2 is an expanded diagram indicating details of the OLE DB Data Provider.

FIG. 2 is an expanded block diagram of an exemplary system that may employ the methods and systems of the present invention as shown in FIG. 1. To better illustrate the functioning of the present invention, an exemplary embodiment of the present invention is used throughout the specifications in which the data-access system 102 has a Unisys OLE DB Data Provider 20 and which is interfacing via API 24 with a Windows™ client application 100 (such as substantially all versions of Microsoft Windows released from 1995-2003, Windows NT and XP) at one end, and with an Enterprise Database Server 104 operating on a Unisys ClearPath Master Control Program (MCP) platform at the other end, although it should be noted that the present invention is not in any way limited to the foregoing exemplary products.

As shown in FIG. 2, the data access system 102 includes the OLE DB Data Provider 20 and the communication subsystem 22. The OLE DB Data Provider 20 is a two-tiered request-response processing application that includes a client-end 20A and a server-end 20B which communicate with one another via the communication subsystem 22, such as a TCP/IP network. The client-end 20A includes data provider object 25 and transport object 26, while the server-end 20B includes the server library 28 and Worker 27. The OLE DB Data Provider 20 enables the client application 100 to request data from the Enterprise Database Server 104 operating on a ClearPath Master Control Program (MCP) platform (also known as DMSII by those skilled in the art). The Windows™ client application 100 can be remote or it can be executing on the Windows™ operating system side of a ClearPath MCP server 104. In an exemplary embodiment, the client application 100 runs on the same platform as the client-end 20A of the OLE DB Data Provider 20.

The overall operations of the present invention will now be disclosed in greater detail in conjunction with FIG. 2. As shown in FIG. 2, a client request for information from the client application 100 is received by the data provider object 25 which interacts with the client application via an application program interface (API) 24. In an exemplary embodiment, the data provider object 25 presents an OLE DB data source via API 24 to the client application 100. Once the client-request is received in the data provider 20, the data provider object 25 then passes the client-request to the transport object 26. The transport object 26 is adapted to use the communication subsystem 22 to forward the client-request to server-end 20B, where it is ultimately received by Worker 27 which is activated on demand by the Server Library 28. The Worker 27 then interacts with the Enterprise Database Server 104 to search for and obtain the requested information from the Enterprise Database Server 104. Once the information is obtained, the Worker 27 packages the information in a proprietary data format and forwards it back to the data provider object 25 via the communication subsystem 22 and transport object 26. The data provider object 25 subsequently converts the information received from the Worker 27 into a predetermined OLE DB format recognized or requested by the client application 100 and then presents the information to the client application 100 in that format. In other words, the Worker 27 sends data from the backend database in a native format and the Provider 25 converts it to requested OLE DB data types. In an exemplary embodiment of the present invention, the Worker 27 and data provider object 25 each include data-storage capabilities such as random-access-memory (RAM) or a magnetic data-storage disk for storage of received data.

In an exemplary embodiment, three types of data providers are included within the OLE DB Data Provider 20: (1)

Enterprise Database Server data provider such as Unisys-.DMSII, which Supports read/write access to data from the Enterprise Database Server 104; (2) MCP Data File data provider, such as Unisys.NXFile, which allows read-only access to data from MCP sequential, relative and indexed (KEYEDIO and KEYEDIOII) files; and (3) DMS (Data Management System) data provider, which allows access to databases on ClearPath OS 2200 databases. Generally, a client application 100 initiates one such data provider object 25 for each database 104 from which it requires data by creating an instance of the data provider object 25 as data source. A client application 100 can initiate simultaneous data provider objects 25. The databases 104 can be on the same or different systems. In turn, the data provider object 25 starts a single transport object 26 and Worker 27 which retrieve data from the database 104 and returns it to the data provider object 25 for presentation to client application 100. In an exemplary embodiment using the Windows™ application, a Microsoft multi-threading operation is supported during this process.

Typically, a data provider object 25 initiates a Worker 27 to perform the activities for data retrieval from database 104 required by the data provider object 25. The Worker 27 retrieves the data from the database 104 and prepares it for transport through the server library 28 and the communication subsystem 22 to the transport object 26. The data provider object 25 operations are terminated by the client application 100, but as long as the data provider object 25 is active, the client application 100 can continue to use it for data requests. The system automatically terminates the operations of the Worker 27 once the operations of data provider object 25 that the Worker 27 has been serving, has also been terminated.

Figure 3A:
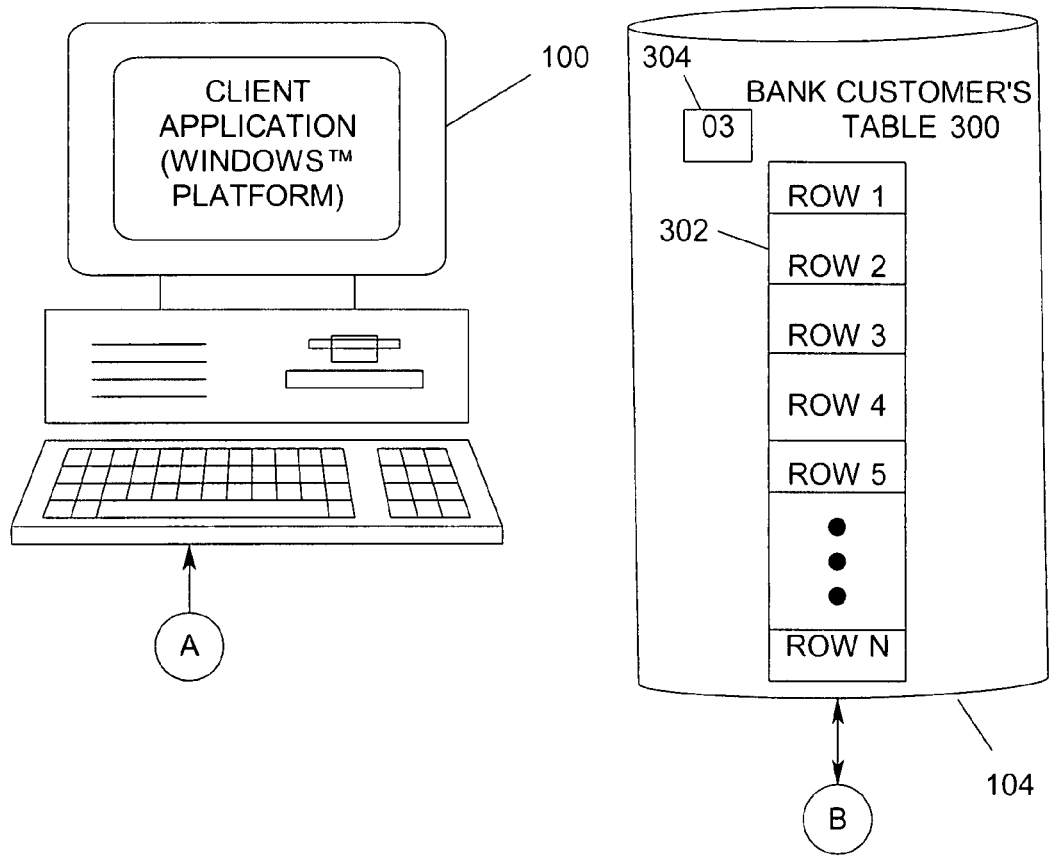
FIG. 3A is a drawing illustrating a customer's table holding multiple rows of data.

FIG. 3A illustrates an expanded block diagram as currently used in the art for accessing data from a database. In databases such as database 304, data are stored in data tables, with each table typically containing a set of rows, and each row having column-attributes in which the data is stored. For ease of search and access, information stored in each table is often categorized based on predetermined characteristics of the stored data. For example, in the environment of a bank, a typical bank customer table 300 contains a set of rows 302, such as Row 1-Row N, wherein each row of 302 corresponds to an individual customer. Each customer row has also a number of column-attributes (not shown) in each of which data corresponding to that customer is stored, such as CUSTOMER NAME, ADDRESS, BANK ACCOUNT NUMBER, and current and previous account balances. When a modification to a bank customer table 300 is to be done, such as updating customer records, a client application 100, such as a banking client application, requests obtaining of one or more rows 302 from one or more tables in the database 304. Modifications are done to one or more columns of each individual row and then the modified rows are transmitted to the data store. When inserting new customer information, an empty row is generally first created and then all the required column attributes Such as customer-name, address, bank account number filled. This modified row is then transmitted to the data store to be created in the customer table.

Although currently OLE DB data providers (20) enjoy widespread usage for retrieval of data from databases, improvements can always be made, particularly when the OLE DB Data Providers are used for updating accessed data from a database.

Generally, to obtain one or more rows from bank customer table 300 (FIG. 3A) the client application 100 instructs the data provider object 25 to initiate an updating transaction using a predetermined obtaining protocol specified by the client application 100. The predetermined obtaining protocol specified by the client application 100 may vary from one row 302 to another. The data provider object 25 then initiates an updating transaction containing the instructions received from the client application 100 and communicates the transaction to the Worker 27 in the manner described in FIG. 2. The Worker 27 then communicates with database 104 to obtain the requested rows from table 300 based on the predetermined obtaining protocol specified by the client application 100. In an exemplary embodiment, the predetermined obtaining protocol uses a transaction isolation level which is either: (i) a lower isolation level, such as Read Uncommitted (UC) and Read Committed (CR) which allow for changes to be made to the data in the database 104 that correspond to the requested data during the initiated updating transaction; or (ii) a higher isolation level such as Repeatable Read (RR) and Serializable Read (SR) which prevents any changes to be made to the data in the database 104 that correspond to the requested data during the initiated transaction. These transaction isolation levels are shown in FIG. 3B in rows 306.

Once the desired rows, such as rows 1-5, item 324, are obtained, the Worker 27 forwards the obtained rows 306 to data provider object 25 in the manner described in FIG. 2. The obtained rows 306 are then stored in the data provider object 25. In an exemplary FIG. 3B embodiment, a set of row handles 308-316 are used in the data provider object 25, with one row handle for storing each of rows 1-5. A row handle may also include column-attributes for storing additional information corresponding to each row, such as a table name attribute 318 for storing the name of table 300 (i.e., "Bank Customer Table"), a table number attribute 320 for storing a table number, such as table number 304 (FIG. 3A), and other attributes such as reference Count attribute REF CNT 322 for storing the number of times a row is referenced by the client application 100. A copy of each of obtained rows 306 is also made (FIG. 3B), as shown by modified rows 324, for performing modifications requested by the client application 100 so that the originally obtained rows 306 will not be changed as a result of the modifications.

Once the modifications by client application 100 are performed, then the modifications are sent to database 104 for updating of the Bank Customer table 300 (FIG. 3A). To ensure that no changes have been made to the corresponding data in the database 104 since the obtainment of the rows 306, both the obtained rows 306 and the modified rows 324 (FIG. 3B) are sent by the data provider object 25 to the Worker 27, as shown in FIG. 3B. Worker 27 then compares each of the obtained rows 306 with the corresponding data in the database 104. If no discrepancies are found, then it is deemed that no changes have been made to the corresponding data in the database 104 since the obtainment of that row, and thereafter, that row in table 300 is replaced with its corresponding modified row, or deleted if such has been requested. If discrepancies are found, then it is deemed that changes have been made to the data in the database since the obtainment of the row, and the client application 100 is then notified of this circumstance, such as by way of a transmitted error message.

While this approach provides an effective method for preserving the integrity and accuracy of data in the database, it results in inefficient use of the system and networking resources. In particular, excessive network traffic is caused by transmission of the obtained rows 306 along with the modified rows 324 to the database, as well as extra consumption of the processor resources for verifying concurrency control constraints in comparing each of obtained rows 306 with the corresponding data in the database 104. This inefficiency becomes particularly stark in high volume multi-programmed transaction processing environments where it is highly imperative that a client application 100 which perform update-intensive tasks on the databases, be able to do so in as efficient a manner as possible to reduce operational processing time.

Figure 3C:
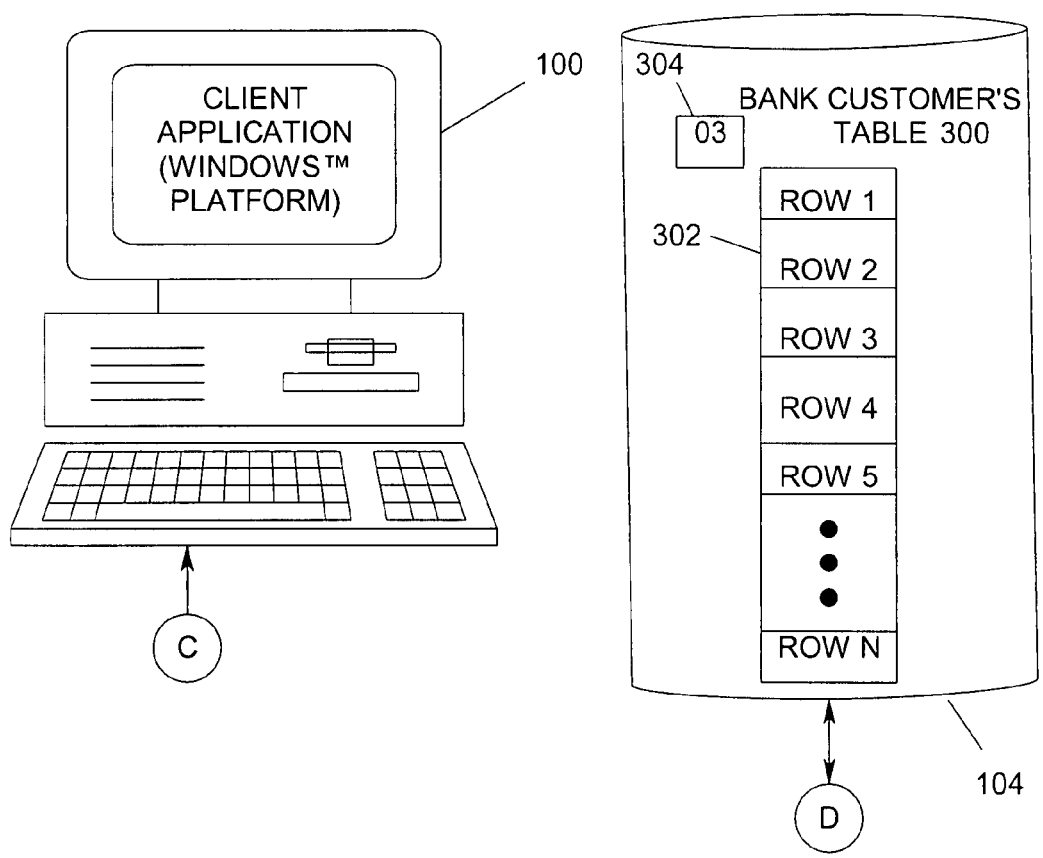
FIG. 3C is a drawing of a customer's table which communicates with the Data Provider and Worker modules of FIG. 3D.

FIG. 3C is a drawing of a Bank Customer Table connecting via marker D to the Worker in FIG. 3D.

FIG. 3D is an expanded block diagram illustrating an exemplary system that may employ the methods and system of the present invention which reduces the need for transmission of the obtained rows along with the modified rows, and therefore eliminates the comparison of the obtained rows with the corresponding data in the database, thus to increase the overall efficiency of a data access system. FIG. 3D indicates how rows 2, 3, and 4 have been deleted leaving Row 1 (CR) shown at 29 and Row 5 (UC). Column 404 indicates, for each row, the Predetermined Transaction Identifier (PID) or Unique Transaction Identifier (UID).

In one embodiment, to obtain one or more rows from bank customer table 300, the client application 100 instructs the data provider object 25 to initiate an updating transaction using a predetermined obtaining protocol specified by the client application 100. The predetermined obtaining protocol specified by the client application 100 may vary from one row 302 (FIG. 3C) to another. Upon receiving the instructions, the data provider object 25 then generates a unique transaction identifier (UID) for the initiated transaction. The data provider object 25 then communicates the transaction to the Worker 27 in the manner described in FIG. 3B. The Worker 27 then communicates with database 104 to obtain the requested rows from table 300 based on the predetermined obtaining protocol specified by the client application 100. Once the desired rows, such as rows 1-5 are obtained, the Worker 27 forwards the obtained rows 306 to data provider object 25 in the manner described in FIG. 2. The obtained rows 306 are then stored in the data provider object 25, such as in a set of row handles 308-316 in the manner described in FIG. 3B.

In the present invention, a transaction identifier is then assigned to each row based on the predetermined obtaining protocol requested to be used for obtaining of that row from table 300 in database 104. If the predetermined obtaining protocol is a higher isolation level, then the generated unique transaction identifier of the transaction used to obtain the row is assigned to that row, such as UID1 402 (FIG. 3D) having a unique value. If the predetermined obtaining protocol is a lower level isolation level, then a predetermined transaction identifier, such as PID 400, having a predetermined value, such as zero is assigned to that row. In an exemplary embodiment, the assignment is performed in the form appending of a new column-attribute 404 to each row handle 308-316 in each of which the transaction identifier generated for that row is stored.

In an embodiment of the present invention in which only one updating transaction is initiated and completed at a time, and wherein rows are only modified or deleted in the transaction in which they were fetched, once the modifications by client application 100 are performed, then the modifications are sent to database 104 for updating of table 300 in the following manner: For each row, first the transaction identifier (PID, UID) assigned to that row is obtained, such as by retrieving the contents of a column-attribute 404 in the row handle for that row. If the obtained transaction identifier is a unique transaction identifier (UID) denoting the use of a higher isolation level in obtaining of the row, then it is deemed that no changes have been made to the corresponding data in the database 104 since the obtainment of that row. This is because a higher isolation level inherently prevents any changes to be made to the data in the database 104 that correspond to the obtained data during the initiated transaction, and thus in this regard no need exists for comparing of the data in the database 104 that correspond to the obtained data. Therefore, transmission of an obtained row as in 29 along with the modified row is not necessary. As shown in FIG. 3D, rows 2, 3, 4 have all been obtained using the higher isolation levels of Repeatable Read (RR) or Serializable (RR) so only the modified row 324 for these rows need be sent to Worker 27, which will then, without comparisons, update the rows in table 300 by replacing them with their corresponding modified rows, or deleting them if such action has been requested.

If the obtained transaction identifier is a predetermined transaction identifier (PID) denoting the use of a lower isolation level in obtaining of the row, then it is deemed that changes may have been made to the corresponding data in the database 104, since the obtainment of that row and therefore, both the obtained rows 306 and the modified rows 324 are sent by the data provider object 25 to the Worker 27, as described in FIG. 3B.

In an exemplary embodiment where the data-access system 102 utilizes unique row identifiers such as bookmarks, then a unique row identifier may be generated for each row, and wherein said row is to be deleted, the data provider object 25 forwards only said unique row identifier to the Worker 27 in lieu of the obtained or modified row, for deletion of that row in table 300 in database 104.

In an exemplary embodiment where only one updating transaction is initiated and completed at a time, then a predetermined flag may be set in lieu of using a unique transaction identifier to denote the predetermined obtaining protocol used. This prevents updatings of said obtained portion by other applications. The flag would then be reset after completion of each transaction for each row still held by the data provider 25. Another predetermined flag may be set in lieu of using a predetermined transaction identifier to denote that the predetermined obtaining protocol used, allows updatings of said obtained portion by other applications. The flag would then be reset after completion of each transaction for each row still held by the data provider 25.

One advantage of the foregoing feature of the present invention over the prior art is, that by identifying those rows which were obtained by a higher level of isolation and forwarding only their modified versions or unique row identifiers (in case of a delete) to the database, the need for transmission of the obtained row and the comparison of the obtained row with the corresponding data in the database is reduced, thus to increase the overall efficiency of a data access system.

Since the OLE DB Provider 20 is a two tiered system (20A, 20B) with client and server components, the Data Provider implementation uses objects on the client side to represent database entities like tables, rows, indexes etc. For example, a rowset object represents and provides access to a table. And, a row handle object represents and provides access to a row fetched by the application. The rowset object is implemented as a C++ class called CRowset and this is contained in the Data Provider Object 25.

A portion of the CRowset class is described as follows:

```
class CRowset {
    public:
            CRowset (IUnknown    *pUnkOuter,
                    :
                    :
                    );              // Constructor
            ~CRowset (void);        // Destructor
    // IAccessor Methods
                    :
            virtual HRESULT CreateAccessor (
                                DBACCESSORFLAGS,
                                :
                                const DBBINDING[ ],
                                :
                                )
    // IRowset Methods
            virtual HRESULT GetData(
                                HROW,
                                HACCESSOR,
                                void *);
    private:
                    :
            BOOL                    m_GetData_CanDefer;
                    :
}
```

In the above CRowset class, the method with the same name as the class, CRowset is called a constructor, which is executed when the class is instantiated. Similarly the method ~CRowset is called a destructor and is executed when the class is destroyed. Methods such as CreateAccessor, GetData are used by consumer applications to create accessors and transfer column data to the application's data buffer. Among several private member variables of this class is a Boolean member variable called 'm_GetData_CanDefer'. This variable is used to indicate whether rows can be fetched solely from the index associated with this rowset based on the column bindings and is explained later.

Now referring to FIG. 4, there is seen a flowchart illustrating the steps for inserting a row of data in a normalized data structure. The sequence starts at step 4a, at which point a decision block occurs at step 4b. Here, the query is asked "does the rowset contain a unique key?" If there is no unique key for that row, then the answer NO results in step 4bn, which is an error message being returned.

At step 4b, if the answer is YES, that is, the row set does contain a unique key, then the process proceeds to step 4c, where the program will gather all the key columns for the specified row.

The next step 4d involves the initiate of a SEEK operation for direct positioning at a key value. Then, the processor in the prior application 100 will fetch the row that will be affected by or involved with the insert to be inserted (step 4e). Then, at step 4f, the processor will use the fetched row in order to obtain the child chapter. The child record refers to the columns belonging to the embedded data set.

Then at step 4g, the system will initiate an update sequence with Transport. During this process, a new update request object and initialization of its request buffer will be performed. An encoding update request will be performed for communication with the Server/Worker process on the MCP platform. The Transport Object 26 is a COM component in the Unisys OLE DB implementation, but is used to communicate with a Server/Worker process on the MCP platform by means of the TCP/IP network 22 connecting the client workstation 100 with the MCP server 104.

At step 4h, a decision block will query whether the initiated update is complete. If the answer is NO, the sequence returns back to 4g to initiate the update sequence again. If the answer at step 4h is YES, then the sequence proceeds to step 4i, where the insert action is stored for delivery to the Worker module 27. Then at step 4j, there is a transmittal of the insert action to the Worker module 27 which will access the Enterprise database server 104 (MCP platform) which will install the row of data as a normalized data structure into the database 104. Step 4k indicates the end of the sequence.

Figure 5:
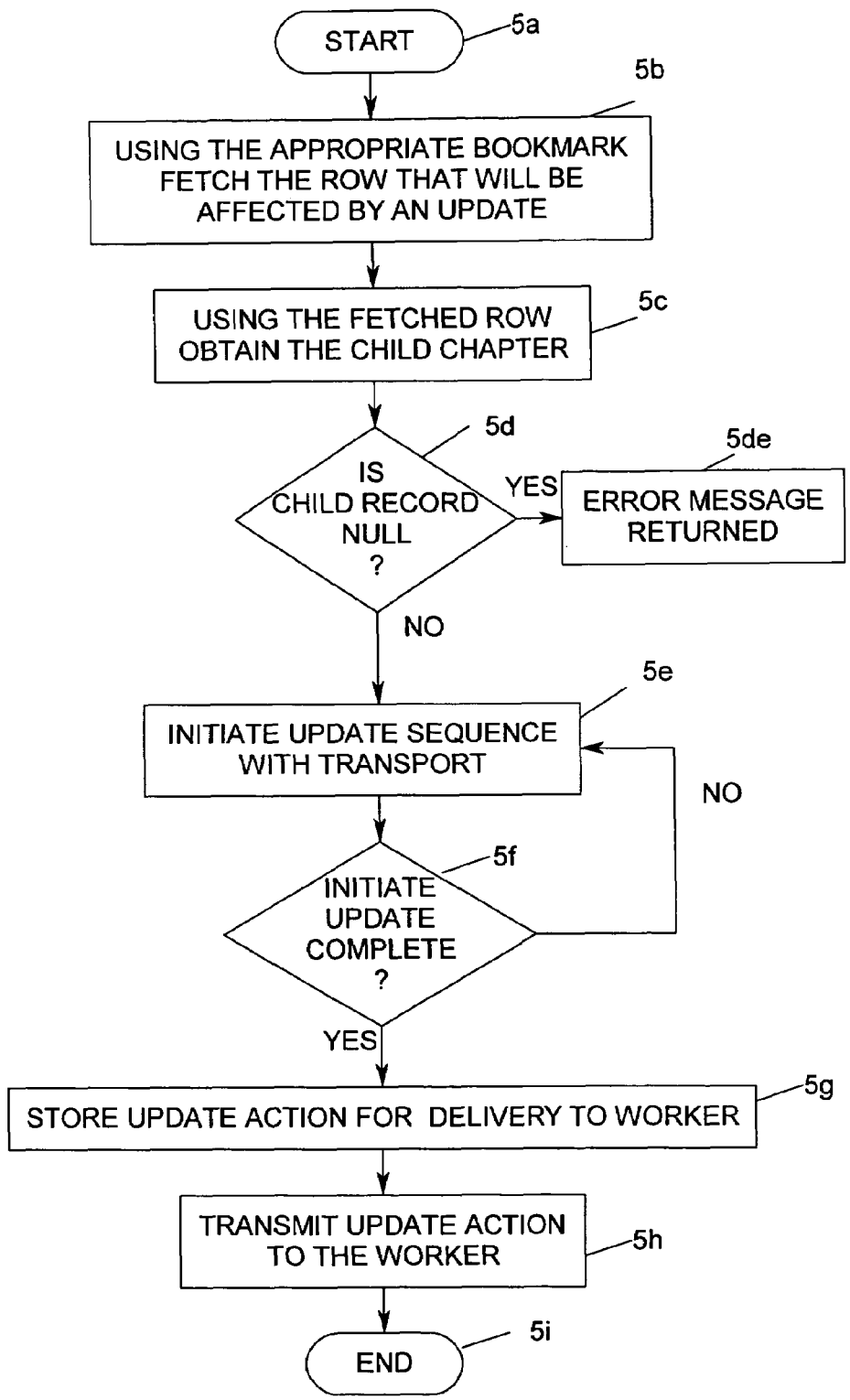
FIG. 5 is a flow chart showing the steps for updating a row of data in a Normalized Data Structure.

FIG. 5 illustrates the steps involved for updating a row of data in a normalized data structure. The sequence starts at step 5a and proceeds to step 5b where the system uses the appropriate bookmark in order to fetch the row that will be affected by an update. Then, at step 5c, the system uses the fetched row to obtain the child chapter. The child chapter contains a child record which refers to the columns belonging to the embedded data set.

At step 5d, a query is asked as to—is the child record null? If the answer is YES, then an error message is returned at step 5de. If the answer to step 5d is NO, that is, the child record is not null, then the sequence proceeds to step 5e, where the system will initiate an update sequence with Transport. Here again, this process allows a new update request object and initialization of this request buffer to be performed. An encoding of the update request will be performed for communication with the Server/Worker processing on the MCP platform 104. The Transport is a COM component in the Unisys AOE DD implementation that is used for communicating with the Server/Worker processes on the MCP platform by means of TCP/IP network 22 connecting the client workstation 100 and the MCP server 104.

Then at step 5f, a query is asked—is the initiate update process complete? Here, if the answer is NO, then the sequence returns back to step 5e. If the answer is YES at step 5f, then the sequence proceeds to step 5g, where the update action is stored for delivery to the Worker 27. Then at step 5h, there is a transmittal of the update action to the Worker 27 for delivery to the MCP server 104 to update the selected row of data in a normalized data structure. Step 5i indicates the end of sequence.

Figure 6:
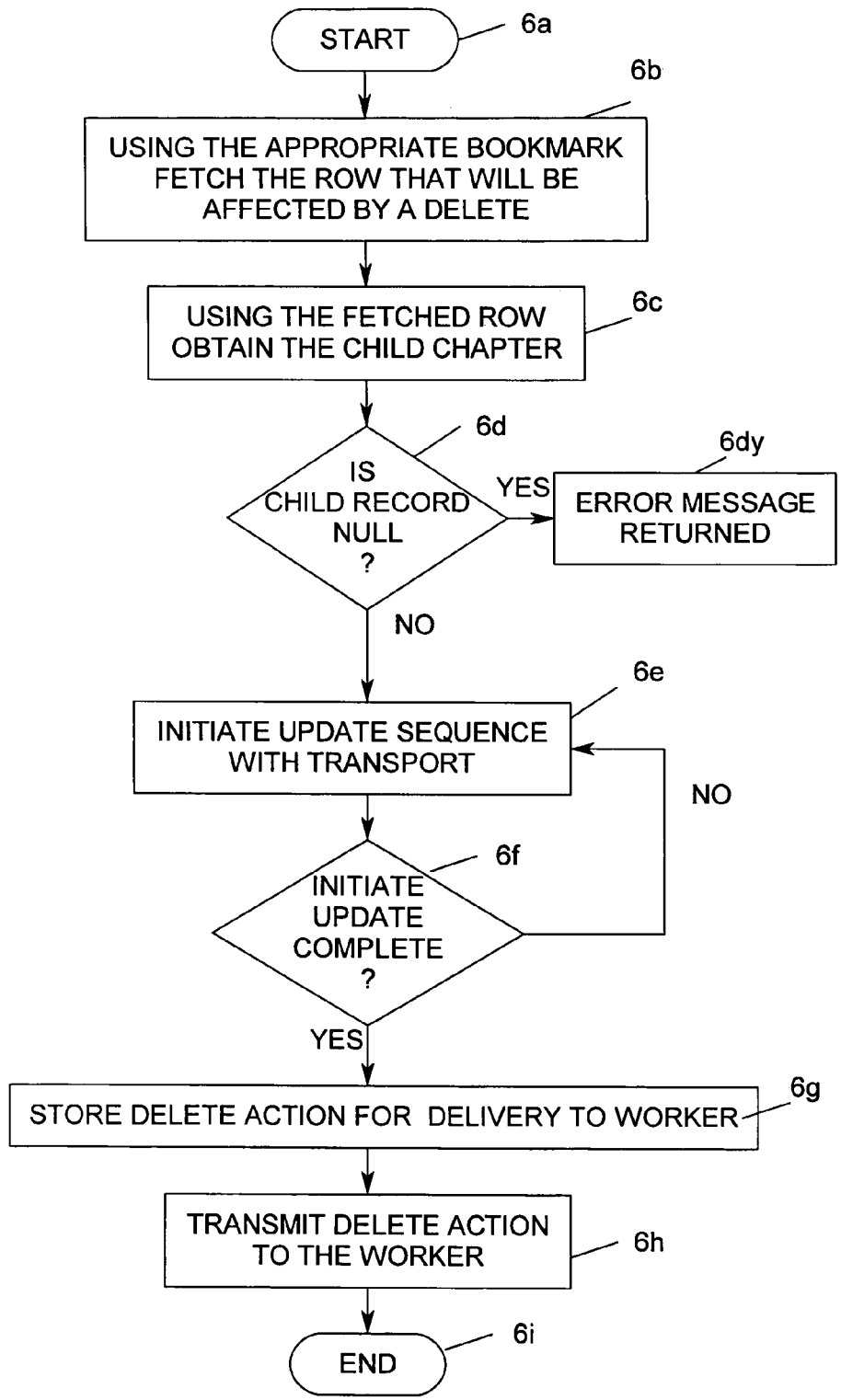
FIG. 6 is a flow chart for deleting a row of data in a Normalized Data Structure.

Now, in reference to FIG. 6, there is seen a series of steps for deleting a row of data in a normalized data structure. The sequence starts at step 6a and proceeds to step 6b. Here, the program uses the appropriate bookmark to fetch the row that will be affected by a Delete operation. The sequence then proceeds to step 6c where, by using the fetched row, it is possible to obtain the child chapter. Then at step 6d, a query is posed—is the child record null? If the answer is YES, the process proceeds to return an error message at step 6dY. If the answer to step 6d is No, then, the process proceeds to step 6e, where the process initiates an update sequence with Transport. During this process of deletion, a new update request object and initialization of this request buffer is performed. An encoding of the update request (relief) is performed by communication with the Server/Worker process on the MCP platform 104.

Then, the process proceeds to step 6f, where a query arises—initiate update complete? here, if the answer is NO, the sequence returns to step 6e. If the answer if YES, the sequence proceeds to step 6g where the delete action is stored for delivery to the Worker 27. Then at step 6h, there is a transmission of this Delete action to the Worker 27 whereupon the Worker 27 transmits the information to the database server 104 for deletion of an appropriate row that was specified. Then step 6*i* ends the sequence.

As a further note in regard to step 6*b*, it should be indicated that bookmarks are placeholders that enable the application to return quickly to a row. Applications that use bookmarks to identify rows to a provider will treat bookmarks as opaque binary values. In the case of a normalized embedded data structure, the bookmark created for each row is a concatenation of the master bookmark and child bookmarks. When an update and a Delete is being performed on a normalized embedded data set, the bookmark is used to locate the correct record to be updated or deleted.

Additionally, in regard to the "normalized data structure", it should be indicated that a normalized data structure refers to an embedded data set that has been "normalized". When embedded data sets are normalized, each row in the normalized row set consists of a record from the embedded data set joined with the columns from the master records. Master data sets are represented as standard OLE DB rowsets in which any columns containing metadata have been suppressed or hidden.

FIG. 7A is a drawing showing a hierarchical structure showing different levels, such as level 1, level 2, and level 3.

This type of hierarchical structure in many cases could not be accessed for handling such as insertions, changes and deletions in the OLE DB formats.

However, as shown in FIG. 7B, if the data is normalized for example, into a customer, orders table, then the system and the method is amenable for accessing various data in order to update it, remove it, or change it.

The present invention enables OLE DB applications to access hierarchical structures as relational tables. There is a provided a mechanism such that OLE DB applications can access embedded table structures (data sets) in hierarchical databases as though they were normalized relational tables.

When embedded datasets are normalized, each row in the normalized rowsets consist of a record from the embedded data sets joined with the columns from the master (or owner) dataset records.

Master data sets are represented as standard OLE DB rowsets in which any columns contained embedded data have been suppressed or hidden.

If embedded data sets have indexes, then normalized indexes are created for every combination of the sets of each data set. Since the outermost disjoint dataset can always be traversed without an associated index, then a pseudo index is associated with the outermost disjoint data set.

As an example, if the master data set designated "N" is seen to have two indexes—a and b—then also the embedded data set designated "E" has three sets X, Y and Z, and as a result two normalized tables are exposed as NM_E.

Also then, nine new indexes are created for the embedded data set by joining each master index with each embedded index. Their names are constructed from the names of the indexes that they comprise separated by an underscore. Thus, the nine new indexes would be as follows:

M_X, M_Y, M_Z,
   A_X, A_Y, A_Z,
      B_X, B_Y, B_Z.

It should be noted that the indexes for the master data set "m" remain the same, these indexes being A and B.

Although the invention has been described with reference to specific embodiments, this description is not meant to be construed in a limiting sense. Various modifications of the disclosed embodiments as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a specialized Data Management System (DMSII) wherein a client application means (100) operates with a Data Access System (102) to communicate with a Database Server (104) operating under a Master Control Program (MCP) a system for enabling OLE DB applications to access normalized relational table structures from hierarchical formatted data in said Database Server (104) comprising the steps of:
  (a) client application means (100) utilizing OLE DB applications for initiating changes in data, accessed from said Database Server (104) holding hierarchical data;
  (b) data access means (102) for communicating requests from said client application means (100) to said Database Server (104) including:
    (b1) means for converting the native hierarchical format of data in said Database Server (104) into relational format suitable for OLE DB applications in said client application means (100);
    (b2) OLE DB Data Provider Object means (20) connecting to said client application means (100) via an Application Program Interface (24) and communicating with a Data Provider Object (25) and transport Object (26), said Data Provider Object for interfacing OLE DB applications to and from a Worker Module (27) via said Transport Object (26) which enables communication between said Database Server (104) and said client application means (100);
    (b3) said Objects (25, 26) connected to a Server Library (28) and Worker Module (27) for transmitting requests and data to and from said Database Server (104).

2. In a specialized Data Management System (DMSII) wherein a client application platform (100) operates with a Data Access System (102) to communicate with a Database Server (104), said Database Server (104) holding hierarchical entities of data designated as embedded datasets, sets and indexes, and operating under a Master Control Program (MCP), a method for enabling OLE, DB applications to access normalized relational table structures compatible for OLE DB applications from hierarchical formatted data in said Database Server (104) comprising the steps of:
  (a) using indexes of embedded datasets to create every combination of the sets of each dataset;
  (b) normalizing said embedded datasets into relational tables;
  (c) enabling said OLE DB application to access said embedded datasets as normalized relational tables,
  (d) providing accesses to said normalized relational tables for insertion of data, or deletion of data.

3. In a system wherein a client application (100) communicates with a database server (104) through an OLE DB Data Provider (20) to access a selected Row of data (rowsets) in said server (104), wherein said server (104) holds a hierarchical database with rowsets indexed to keys with columns that enable OLE DB components to manipulate data in tabular form and further holds a Master Record with a Master row of data, said hierarchical database holding embedded datasets on a parent-child relation designated as OLE DB chaptered rowsets, said server (104) connected via an OLE DB Data Provider (20) which utilizes a Data Provider Object (25) and Transport Object (26) for conveying commands to and from and a Worker Module (27) to communicate to said server (104). a method for inserting a row in a normalized relational data structure organized as a Table, comprising the steps of:

(a) querying to see if said rowset has a unique key which can be used to locate the proper Master record to provide an insertion sequence for a new row of data;

(b) gathering all key columns for the row of said master record, said key columns providing a portion of a data record which contains the key data;

(c) seeking to directly position data to a row in said master record correlated to said unique key;

(d) fetching a selected row that will be affected by said insertion of data;

(e) holding said fetched row while obtaining a child chapter which holds columns of data belonging to an embedded data set;

(f) utilizing said Transport Object means (26) to initiate the update sequence for the selected Row;

(g) checking to see if the insertion sequence has been completed;

(h) temporarily storing said fetched row before delivery to a Worker module (27);

(i) conveying said fetched row to said Worker module (27);

(j) inserting said fetched row into said relational Table which is compatible for said OLE DB application.

4. In a system wherein a client application (100) communicates with a database server (104), holding bookmarks, said server working through an OLE DB Data Provider (20) to access a selected Row of data (Rowset) in a normalized relational table structure, wherein said server (104) holds a hierarchical database with rowsets that enable OLE DB components to manipulate data in tabular form and further holds a Master Record with a Master row of data, said hierarchical database holding embedded datasets on a parent-child relation designated as OLE DB chaptered rowsets, said server (104) connected via said OLE DB data provider (20) to enable utilization of a Transport Object means (26) for conveying commands and to utilize a Worker Module (27) to communicate to said server (104), a method for updating a selected Row of data comprising the steps of:

(a) utilizing a bookmark to fetch the Row to be affected by said update operation;

(b) obtaining the child chapter record using the fetched row of the parent data set sitting in a hierarchical format where said child chapter provides columns of data belonging to an embedded data set;

(c) determining if the child chapter record is not NULL, and if so;

(d) utilizing said Transport Object means (26) to initiate an update sequence;

(e) checking to see that the update sequence initiation is complete; and if so, (f) temporarily storing said update sequence for delivery to said Worker module (27);

(g) transmitting said update sequence to said Worker module (27);

(h) completing said update sequence on said selected Row.

5. In a server means having a bookmark program and including a server database (104) holding hierarchical formatted data including a formatted dataset and a child chapter record which refers to the columns belonging to an embedded dataset, said server database (104) including a Transport Object (26) for communicating to a WorkerModule (27) which access hierarchical data from said server database (104) so that said Transport Object (26) can enable a Data Provider Object (25) to service said OLE DB client application (100), said server database further holding Rows of data in hierarchical format for conversion to relational format compatible for OLE DB client (100) applications in a normalized data structure of relational tables, a method for deleting a selected Row via a delete operation comprising the steps of:

(a) using a bookmark to fetch the a selected Row that will be affected by a delete operation;

(b) obtaining the child chapter record of a hierarchically formatted dataset by using the fetched selected Row;

(c) checking to see that said child chapter record is not NULL; and if so, (d) initializing said delete operation in a Transport Object (26) which enables communication to said Worker module (27) and to said database server (104);

(e) checking to see that said initialization is complete; and if so, (f) storing said delete operation before delivery to said Worker module (27);

(g) transmitting said delete operation to said Worker module (27) for updating access to said server database (104);

(h) deleting the said selected Row.

6. In a specialized Data Management System (DMSII) wherein a client application platform (100) operates with a Data Access System (102) to communicate with a Database Server (104) operating under a Master Control Program (MCP), a system for enabling OLE DB applications to access normalized relational table structures showing rows of relational data from hierarchical formatted data in said Database Server (104) comprising:

(a) means for storing data in hierarchical structures in said Database Server (104);

(b) means for enabling an OLE DB Data Provider (20) via a client-request, to request hierarchical data from said Database Server (104);

(c) means for forwarding said client request via a Server Library (28) to a Worker Module (27) which will search and obtain the hierarchical data from said Database Server (104);

(d) means for transporting said hierarchical data via a Transport Object (26) to a Data Provider Object (25);

(e) means for converting said hierarchical data received from said Worker Module (27) into a OLE DB format using normalized relational format of data types recognizable by the said client application.

7. The system of claim 6 which includes:

(f) means for updating a row of data in said normalized relational format;

(g) means for deleting a row of data in said normalized relational format.

* * * * *